US010742931B2

(12) United States Patent
Kurisaki-Sagberg et al.

(10) Patent No.: US 10,742,931 B2
(45) Date of Patent: *Aug. 11, 2020

(54) DEFINING CONTENT OF INTEREST FOR VIDEO CONFERENCE ENDPOINTS WITH MULTIPLE PIECES OF CONTENT

(71) Applicant: Cisco Technology, Inc., San Jose, CA (US)

(72) Inventors: Øyvind Kurisaki-Sagberg, Bekkestua (NO); Kristian Tangeland, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,245

(22) Filed: Jun. 25, 2019

(65) Prior Publication Data
US 2019/0379862 A1    Dec. 12, 2019

Related U.S. Application Data

(63) Continuation of application No. 16/005,971, filed on Jun. 12, 2018, now Pat. No. 10,397,519.

(51) Int. Cl.
*H04N 7/15* (2006.01)
*G06T 7/70* (2017.01)
*G06K 9/00* (2006.01)

(52) U.S. Cl.
CPC .......... *H04N 7/15* (2013.01); *G06K 9/00335* (2013.01); *G06T 7/70* (2017.01)

(58) Field of Classification Search
CPC .......... H04N 7/15; H04N 7/152; H04N 7/14; H04N 7/147; G06F 3/013

USPC ............................. 348/14.01–14.16; 715/753
See application file for complete search history.

(56) References Cited

U.S. PATENT DOCUMENTS

| 9,100,540 | B1 | 8/2015 | Gates et al. |
| 9,357,168 | B1* | 5/2016 | Leske ................... H04N 7/152 |
| 9,372,543 | B2 | 6/2016 | Lo et al. |
| 9,565,369 | B2 | 2/2017 | Mauchly |
| 9,804,753 | B2 | 10/2017 | Ramsby et al. |

(Continued)

OTHER PUBLICATIONS

Stiefelhagen, et al., "From Gaze to Focus of Attention", International Conference on Advances in Visual Information Systems, Jun. 1999, 8 pgs.

(Continued)

*Primary Examiner* — Melur Ramakrishnaiah
(74) *Attorney, Agent, or Firm* — Edell, Shapiro & Finnan, LLC

(57) ABSTRACT

A video conference system may include two or more video conference endpoints, each having a display configured to display content. The video conference system may detect a plurality of participants within a field of view of a camera of the system. The video conference system may determine an attention score for each endpoint based on the participants. The video conference system may determine whether the content of the first endpoint and/or the content of the second endpoint are active content based on whether the attention scores exceed a predetermined threshold value. The video conference system may send to secondary video conference systems an indication of the active content to enable the secondary video conference systems to display the active content.

20 Claims, 17 Drawing Sheets

(56) References Cited

U.S. PATENT DOCUMENTS

| | | |
|---|---|---|
| 2008/0034085 A1 | 2/2008 | Chawla et al. |
| 2009/0138554 A1 | 5/2009 | Longobardi et al. |
| 2010/0208078 A1 | 8/2010 | Tian et al. |
| 2012/0274736 A1 | 11/2012 | Robinson et al. |
| 2012/0293606 A1 | 11/2012 | Watson et al. |
| 2014/0184550 A1 | 7/2014 | Hennessey et al. |
| 2015/0049162 A1 | 2/2015 | Kurupacheril et al. |
| 2015/0154291 A1 | 6/2015 | Shepherd et al. |
| 2016/0261655 A1 | 9/2016 | Aggarwal et al. |
| 2016/0286164 A1* | 9/2016 | Kratz ........................ H04N 7/15 |
| 2018/0070050 A1* | 3/2018 | Hansen .................... G09G 5/00 |

OTHER PUBLICATIONS

Yun, et al., "Exploring the role of gaze behavior and object detection in scene understanding", Frontiers in Psychology, Original Research Article, doi: 10.3389/fpsyg.2013.00917, Dec. 6, 2013, 14 pgs.
Unknown Author, "Gaze", Microsoft, https://docs.microsoft.com/en-us/windows/mixed-reality/gaze, downloaded from the Internet Feb. 13, 2018, 4 pgs.

* cited by examiner

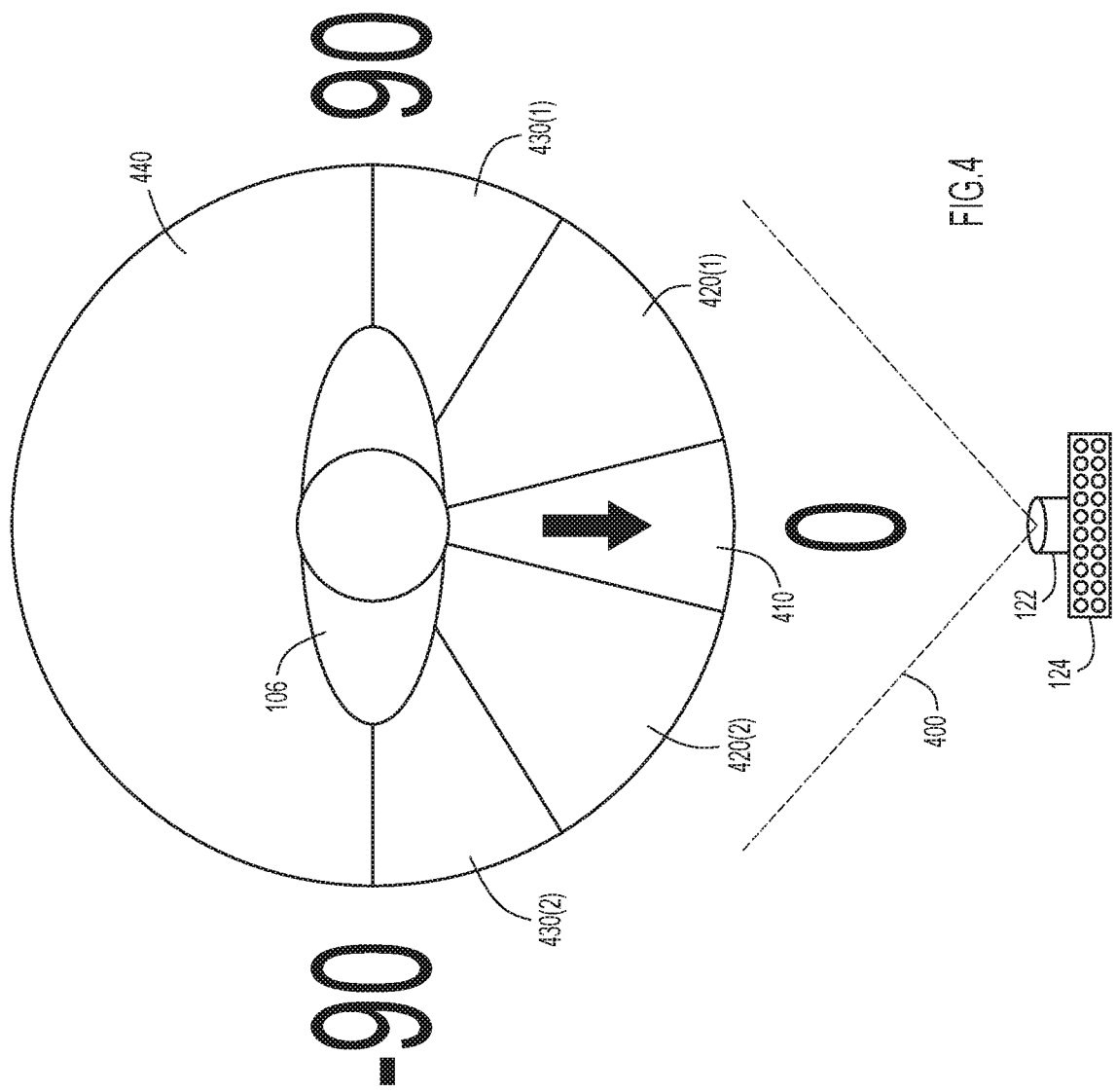

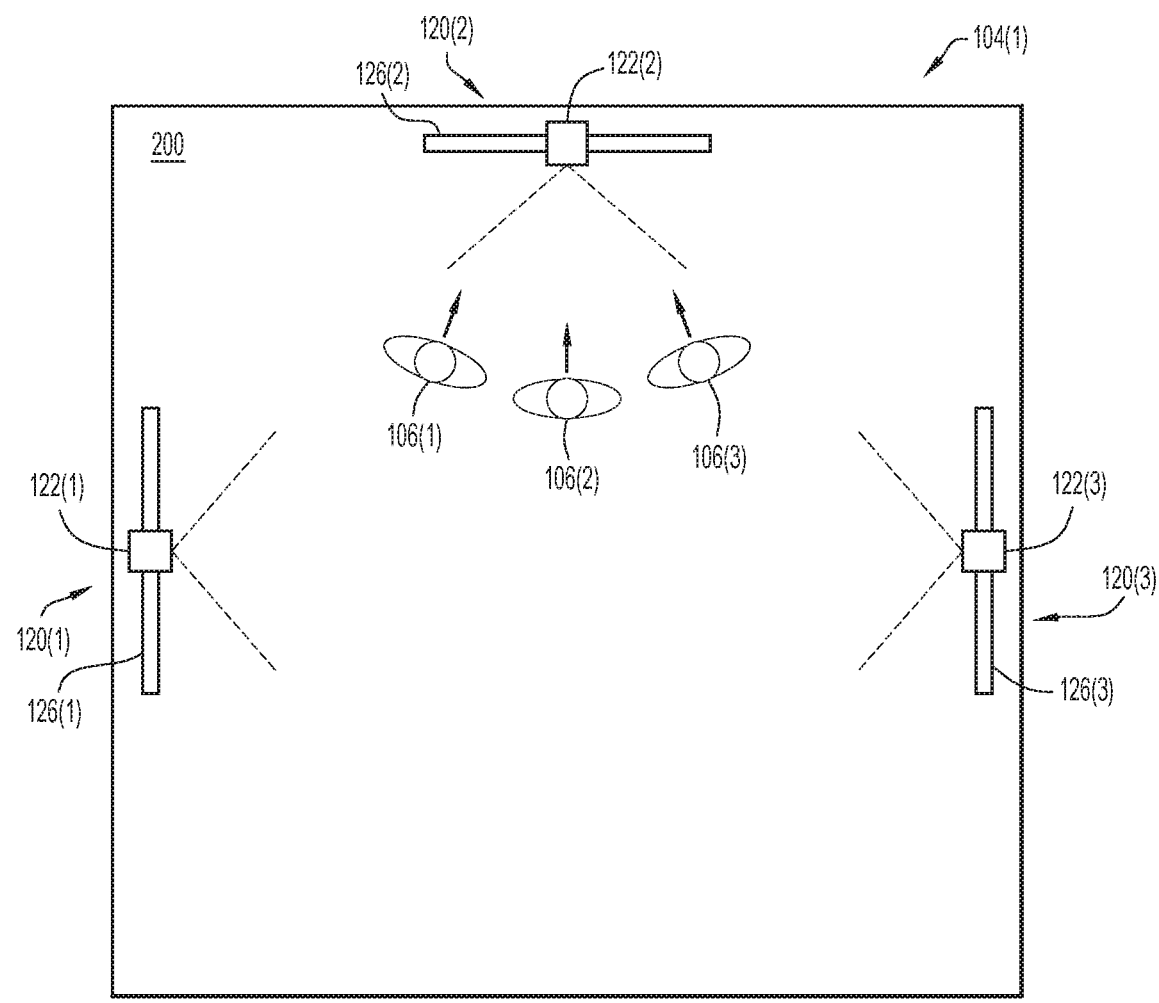
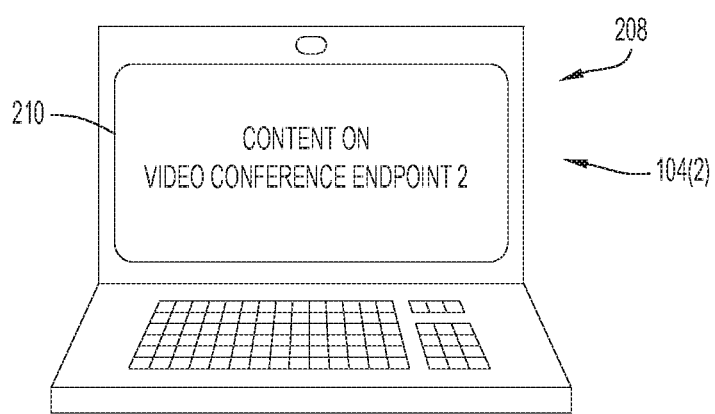
FIG.6A

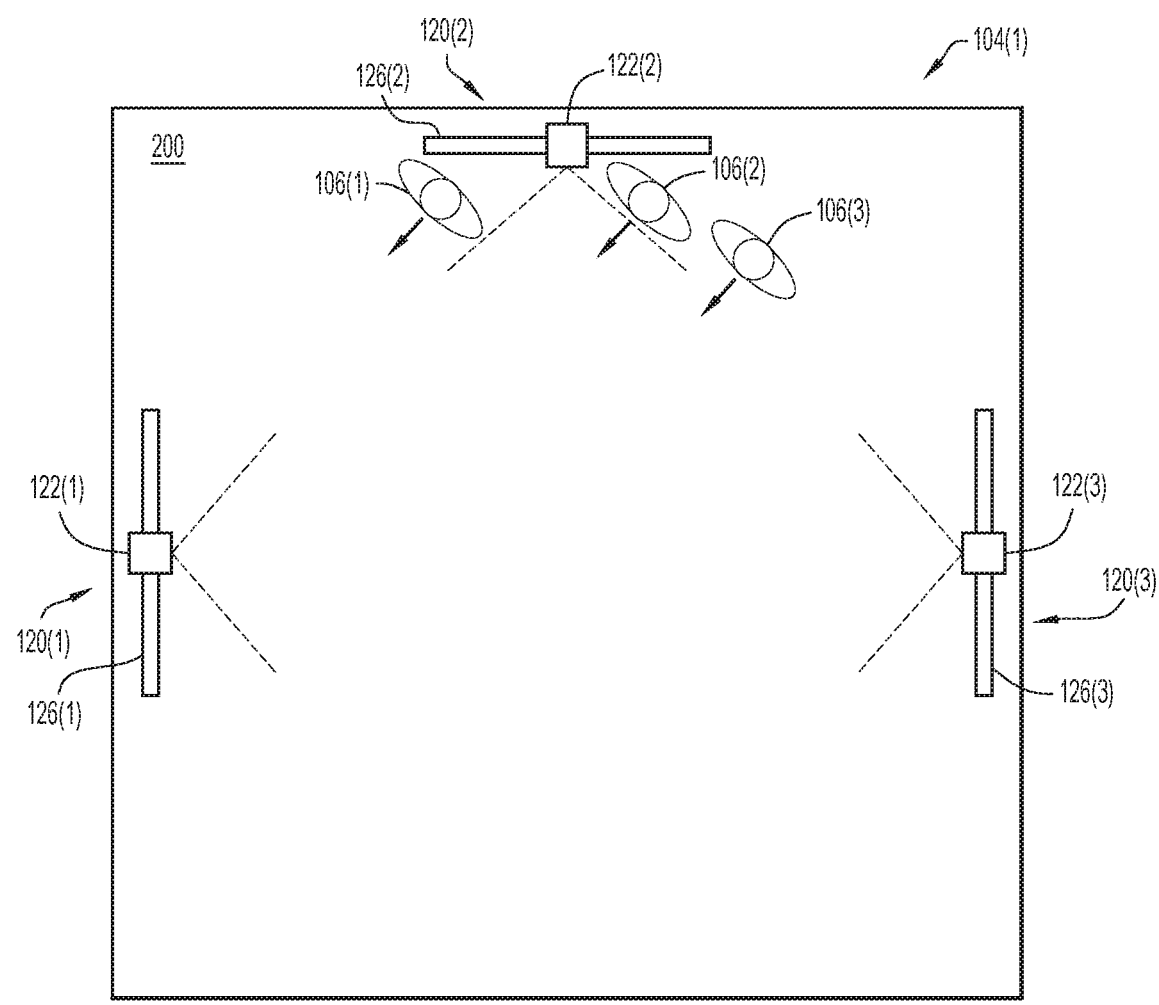
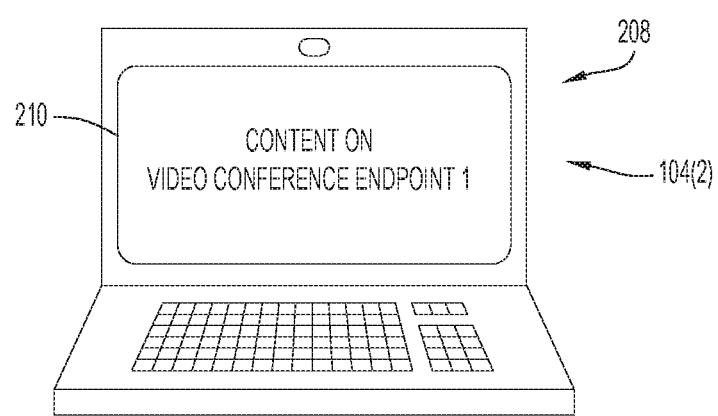
FIG.6B

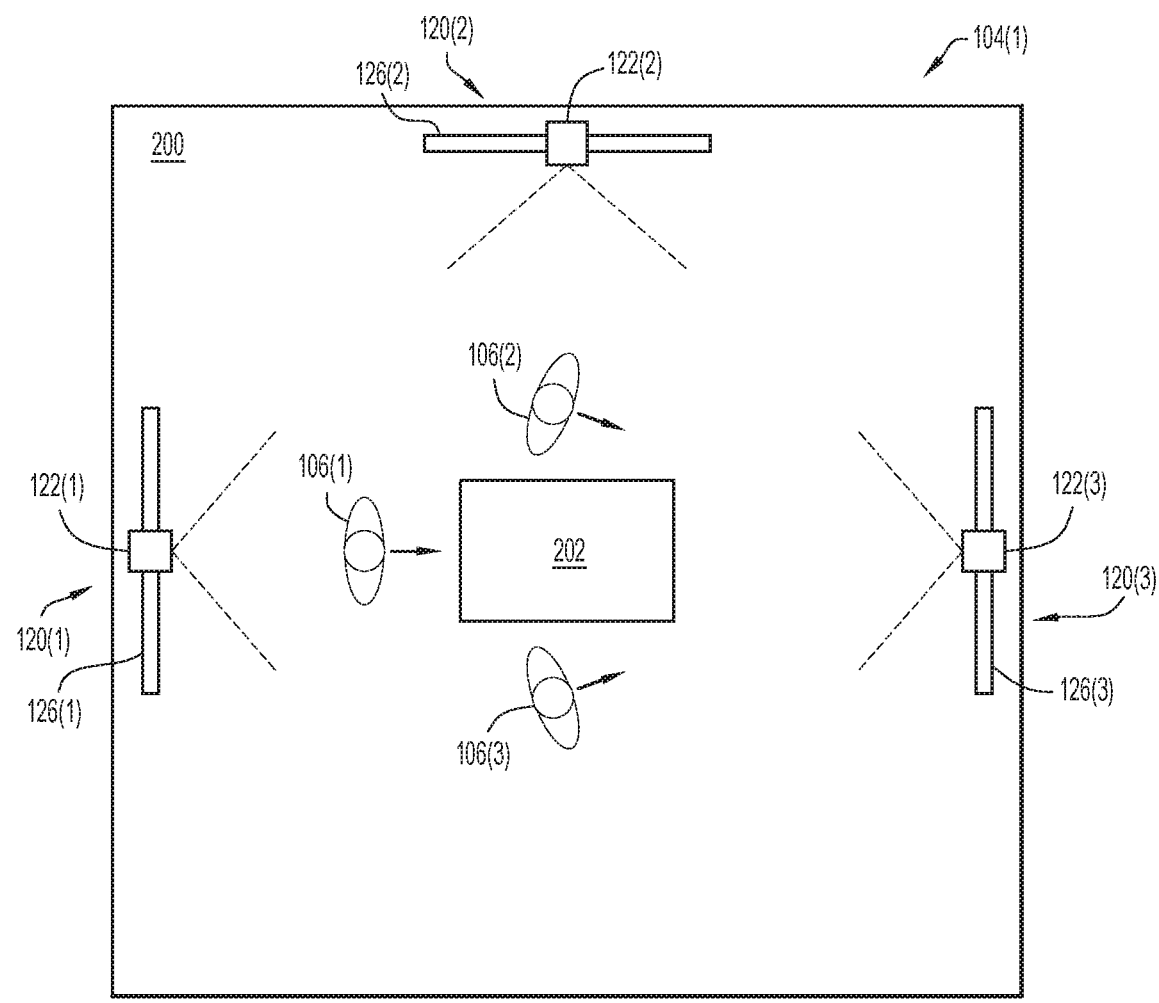
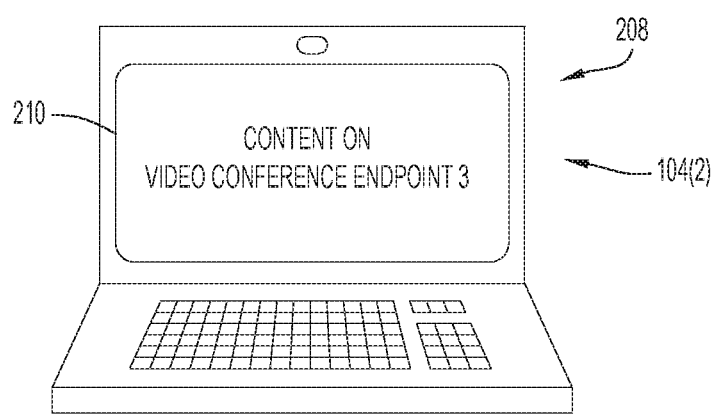
FIG.6C

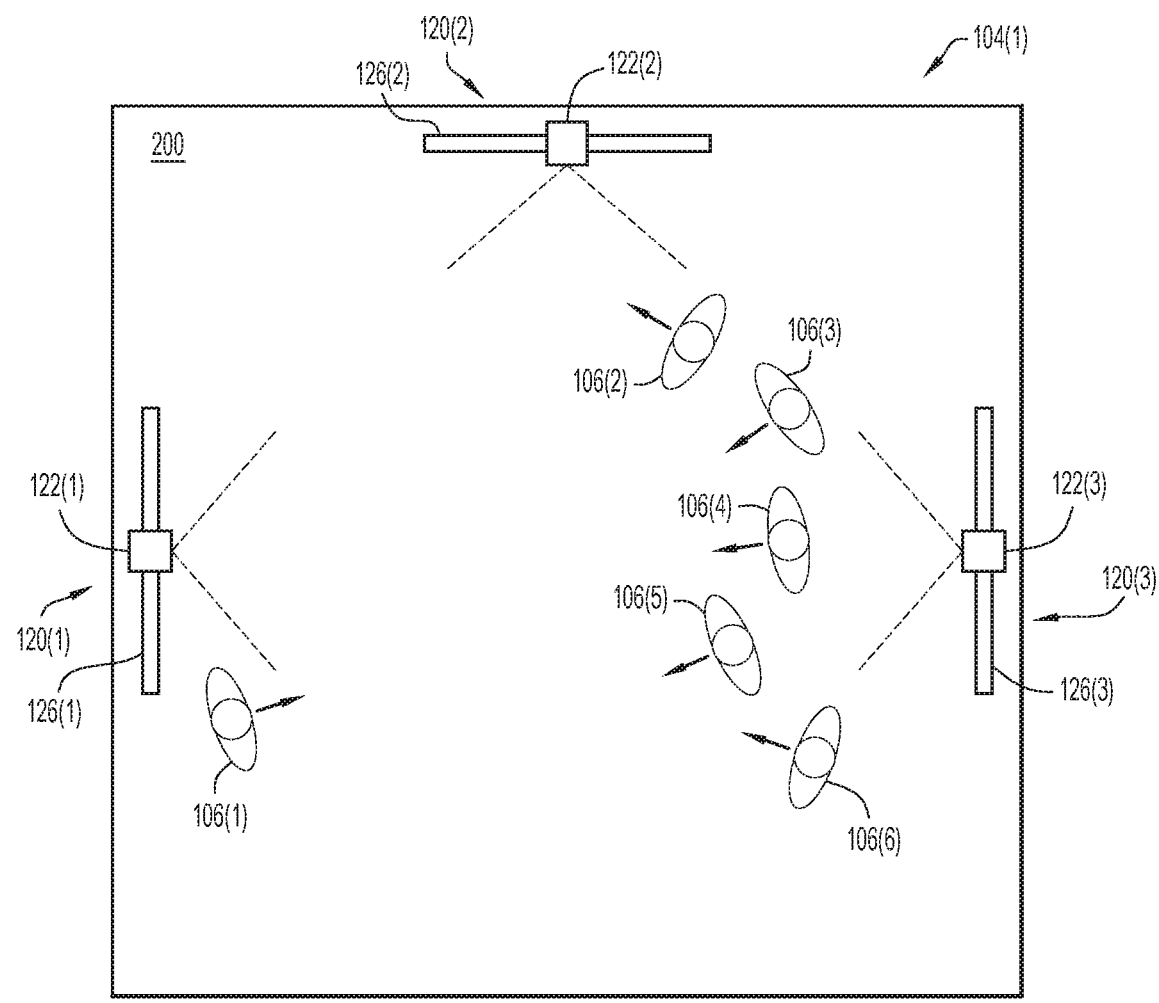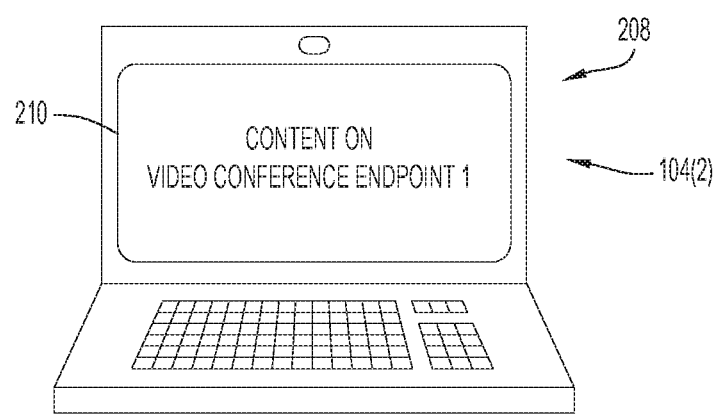
FIG.7

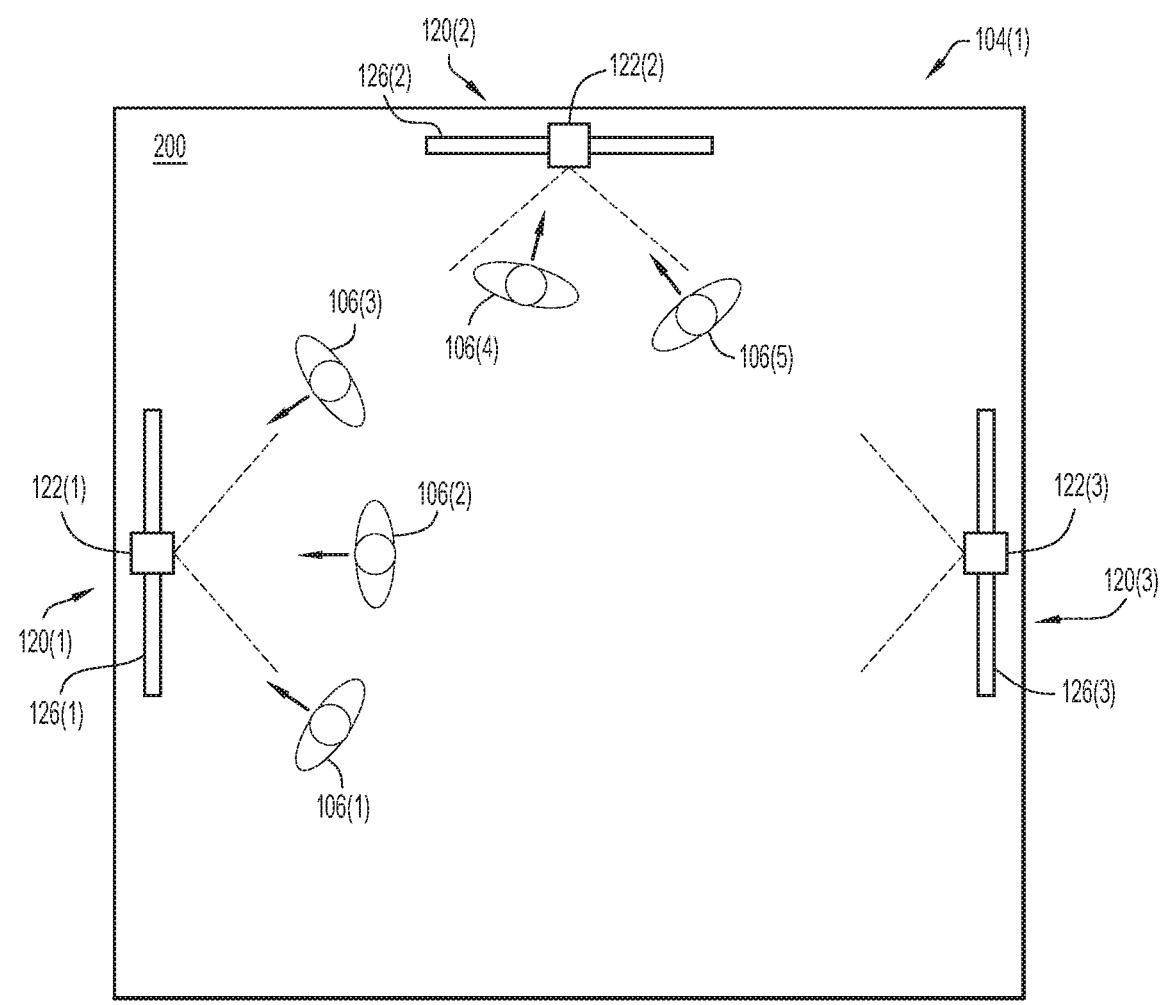
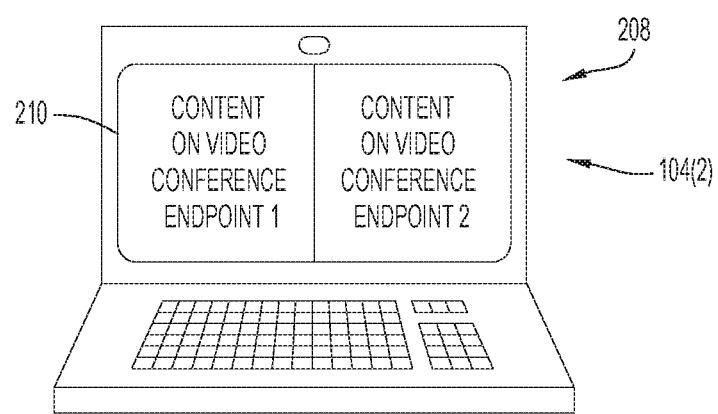
FIG.8

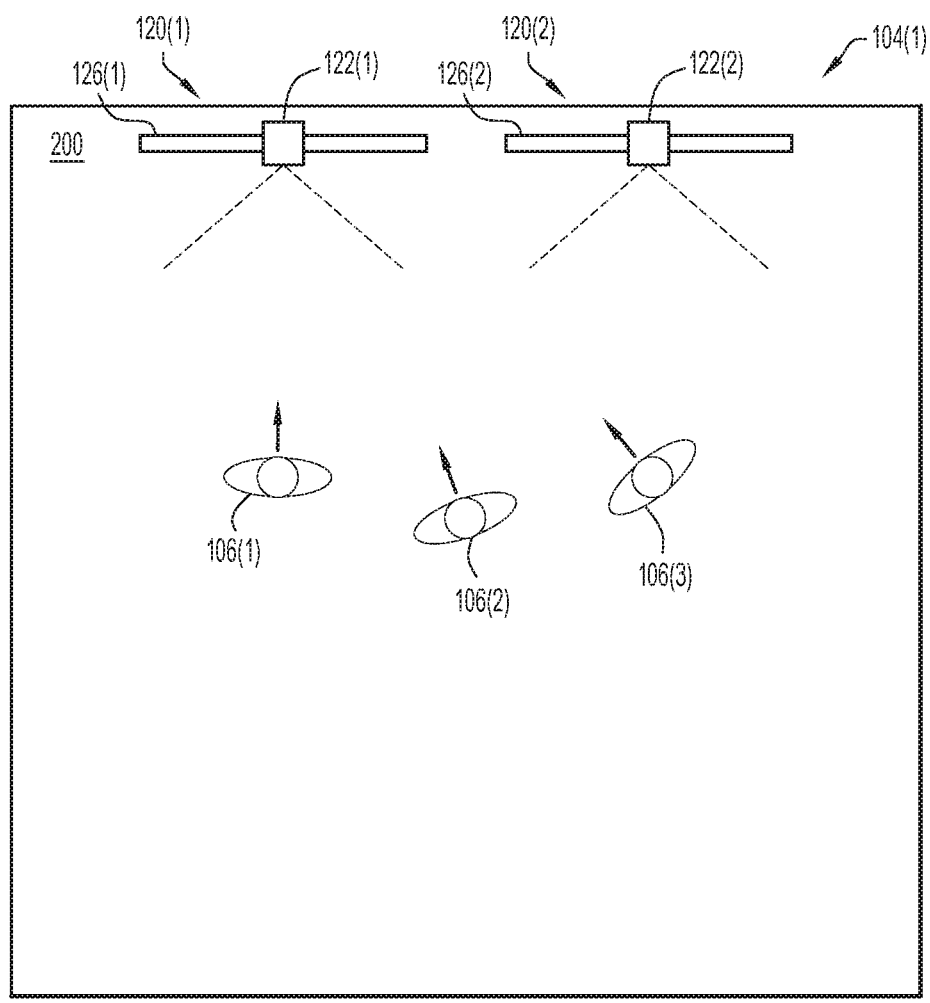
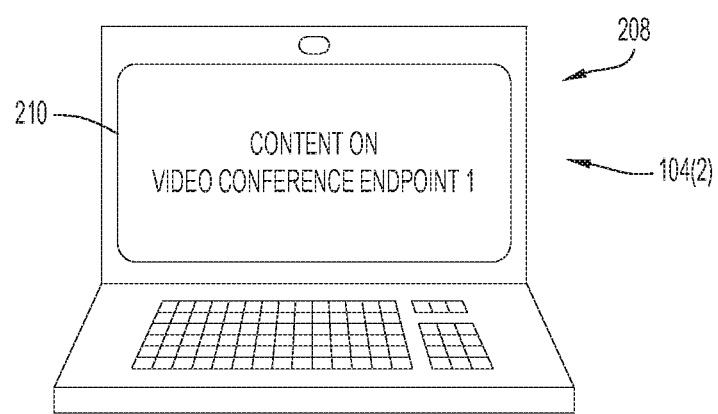
FIG.9A

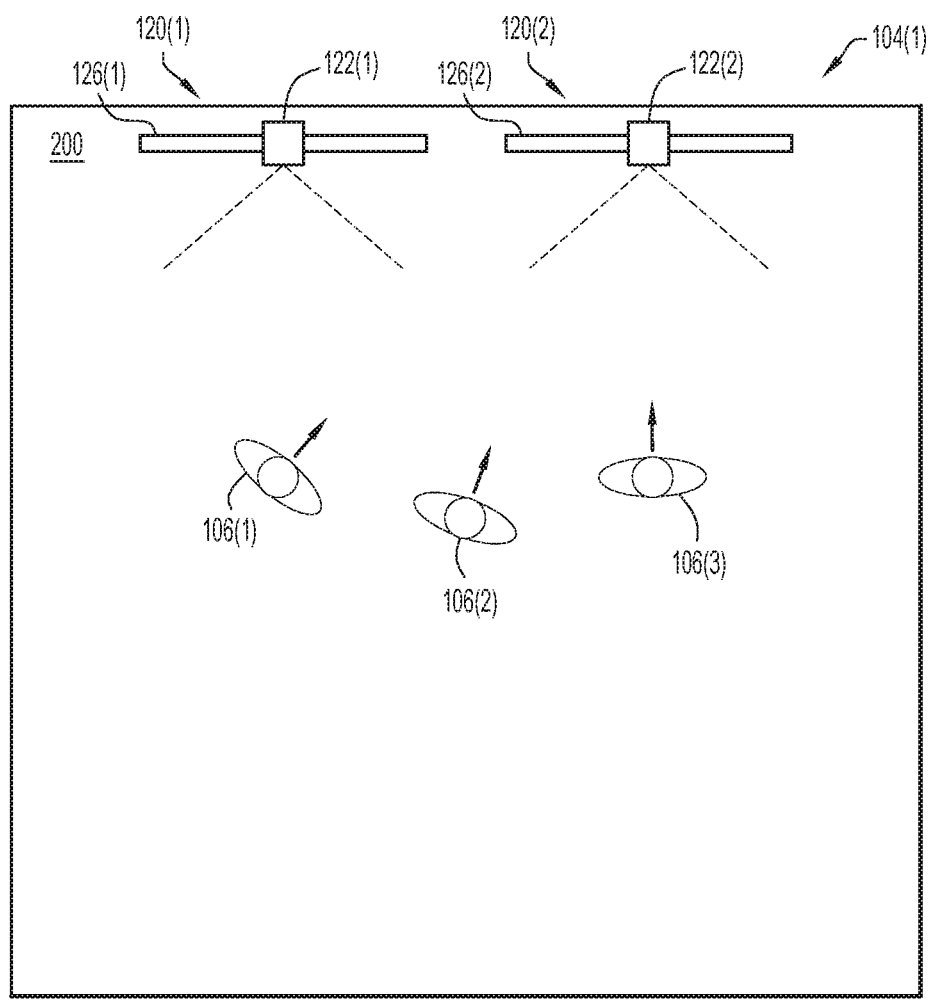
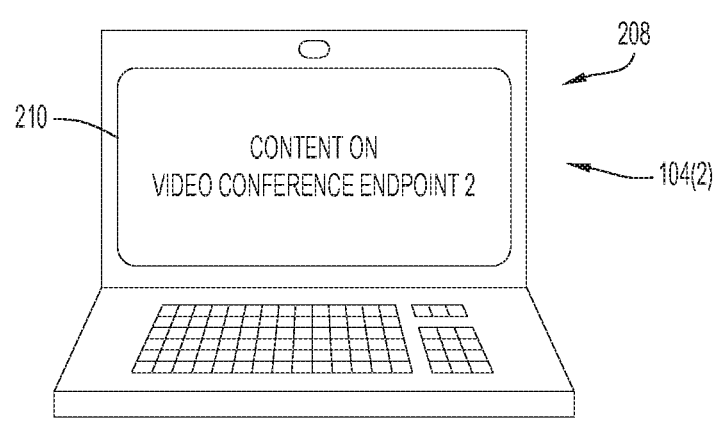
FIG.9B

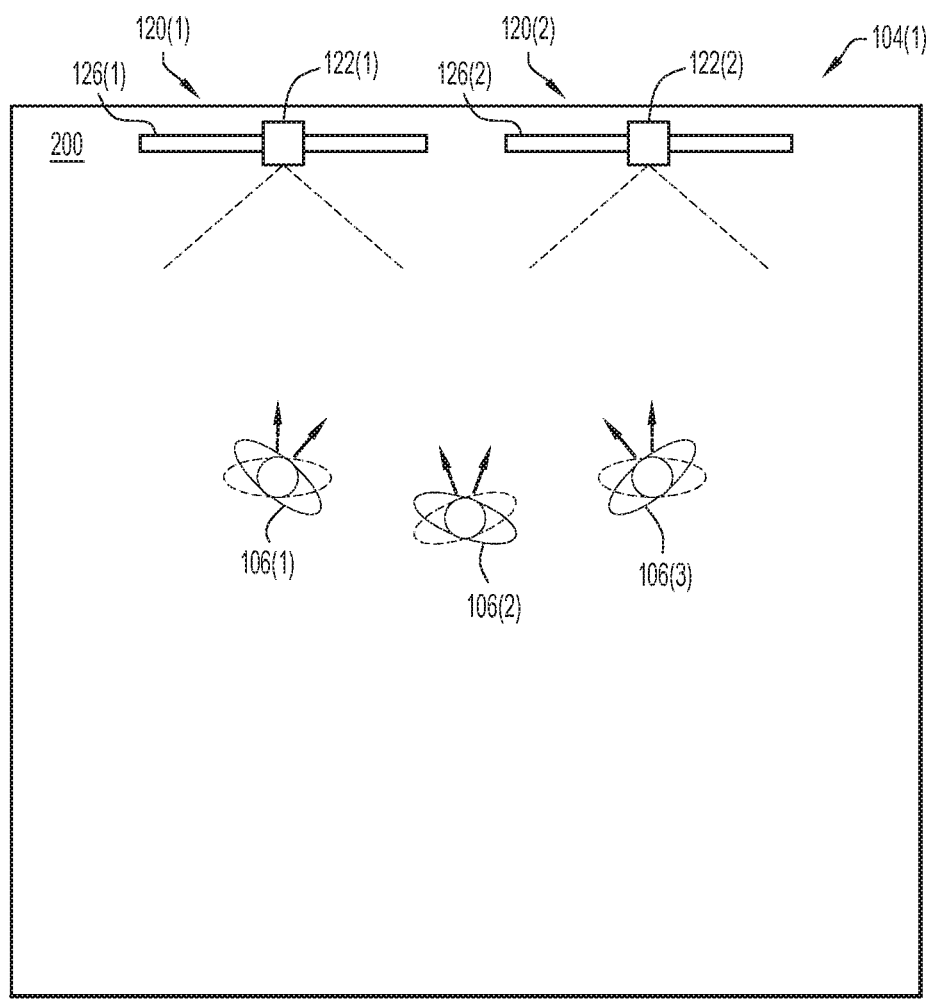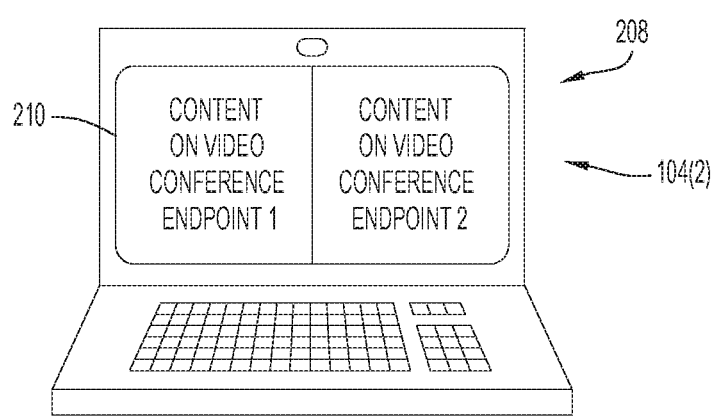
FIG.9C

US 10,742,931 B2

DEFINING CONTENT OF INTEREST FOR VIDEO CONFERENCE ENDPOINTS WITH MULTIPLE PIECES OF CONTENT

CROSS-REFERENCE TO RELATED APPLICATIONS

This application is a continuation of U.S. patent application Ser. No. 16/005,971, filed on Jun. 12, 2018, and entitled "DEFINING CONTENT OF INTEREST FOR VIDEO CONFERENCE ENDPOINTS WITH MULTIPLE PIECES OF CONTENT," the entirety of which is incorporated herein by reference.

TECHNICAL FIELD

The present disclosure relates video conference systems.

BACKGROUND

A video conference session may involve a "near-end" video conference system that captures audio and video of participants in a room during a video conference, for example, and then transmits the audio and video to a conference server or to one or more "far-end" video conference systems. Often, a video conference may be asymmetrical, where a first video conference system at one site contains multiple video conference endpoints, and thus, multiple video conference displays, while a second video conference system at a second site may contain a single video conference endpoint, and thus, a single display. The first video conference system may be able to distribute and view multiple pieces of content over the plurality of displays. The second video conference system with a single display, however, is required to navigate through various content and open the content that is relevant to a discussion during the conference. This degrades the user experience at the second video conference system, and may even cause participants of the second video conference system to miss details presented during the video conference session.

BRIEF DESCRIPTION OF THE DRAWINGS

FIG. 4 is a diagram that illustrates various different head orientation zones of a participant with respect to a video camera, according to an example embodiment.

FIGS. 6A-6C are illustrations of participants at the near-end video conference system oriented to view one of the displays at the near-end video conference system and illustrations of the content that is simultaneously shown at the far-end video conference endpoint based on the orientations of the participants at the near-end video conference system, according to example embodiments.

FIG. 7 is an illustration of participants at the near-end video conference system oriented to view multiple displays at the near-end video conference system and an illustration of the content that is simultaneously shown at the far-end video conference endpoint based on the orientations of the participants at the near-end video conference system, according to an example embodiment.

FIG. 8 is another illustration of participants at the near-end video conference system oriented to view multiple displays at the near-end video conference system and an illustration of the content that is simultaneously shown at the far-end video conference endpoint based on the orientations of the participants at the near-end video conference system, according to an example embodiment.

FIGS. 9A-9C are illustrations of participants at the near-end video conference system oriented to view side-by-side displays at the near-end video conference system and illustrations of the content that is simultaneously shown at the far-end video conference endpoint based on the orientations of the participants at the near-end video conference system, according to example embodiments.

DESCRIPTION OF EXAMPLE EMBODIMENTS

Overview

In one embodiment, a video conference system may include two or more video conference endpoints, each video conference endpoint having a display configured to display content of a video conference. The video conference system may detect a plurality of participants within a field of view of one or more cameras of the video conference system, the one or more cameras being associated with a first video conference endpoint or a second video conference endpoint. The video conference system may then determine a first attention score for first content displayed at the first video conference endpoint based on each of the participants. The video conference system may also determine a second attention score for second content displayed at the second video conference endpoint based on each of the participants. The video conference system may then determine whether the first content and/or the second content are active content based on whether the first and/or second attention scores exceed a predetermined threshold value. The video conference system may send to one or more secondary ("far-end") video conference systems an indication of the active content to enable the one or more secondary video conference systems to display the active content.

Example Embodiments

In one embodiment, techniques are provided to automatically determine the active content of a near-end video conference system containing multiple endpoints that each have their own display. The techniques are further provided to send an indication of the active content to far-end video conference systems that have fewer endpoints than the near-end video conference system to enable the far-end video conference systems to automatically display the active content. These techniques improve the user experience at the far-end video conference systems because the users are not required to determine the current active content, locate the current active content, and emphasize the active content on their display during a video conference. Instead, the techniques presented herein enable participants at the far-end video conference systems to actively participate in the video conference, while the active content of the near-end video conference system is automatically emphasized to be displayed at the far-end video conference system.

Figure 1:
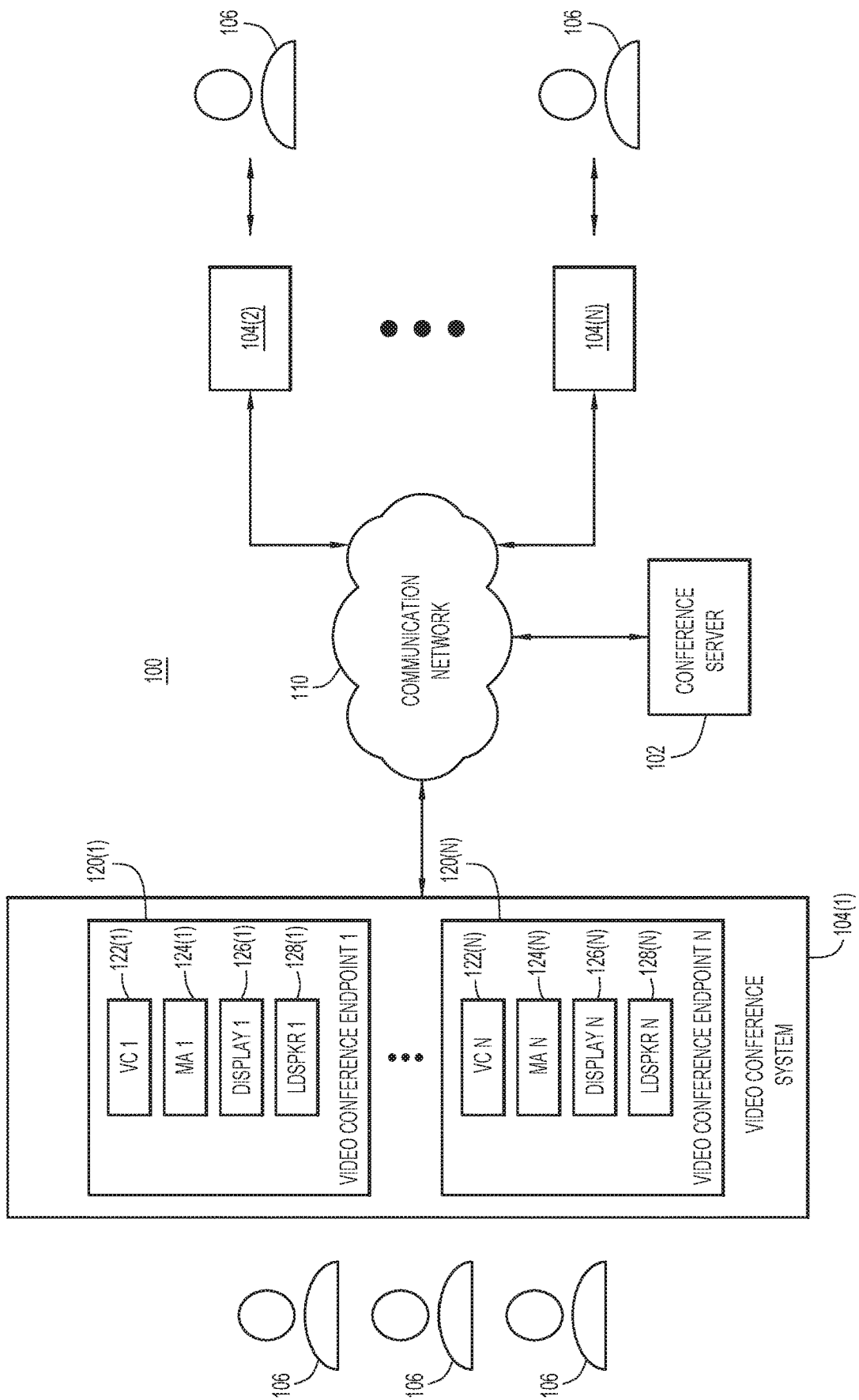
FIG. 1 is a block diagram of a video conference environment in which a near-end video conference system generates information pertaining to the active content at the near-end video conference system and sends the information regarding the active content to one or more far-end video conference systems, according to an example embodiment.

With reference to FIG. 1, there is depicted a block diagram of a video conference environment 100 in which a near-end video conference system defines active content of the near-end video conference system based the participants located at the near-end video conference system. Video conference environment 100 includes two or more video conference systems 104(1)-104(N) often at different locations/sites operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference systems 104(1)-104(N).

Each video conference system 104(1)-104(N) may include one or more video conference endpoints 120(1)-120(N), where video conference endpoint 120(1) may include one or more video cameras (VC) 122(1) and video conference endpoint 120(N) may include one or more VC's 122(N). In addition, video conference endpoint 120(1) may include one or more microphone arrays (MA) 124(1), and video conference endpoint 120(N) may include one or more MA's 124(N). In some embodiments, a video conference endpoint 120(1)-120(N) may not include any VC's or MA's. Video conference endpoint 120(1) may further include one or more displays 126(1) and loudspeakers (LDSPKR) 128 (1) coupled to or integrated with the display 126(1), while video conference endpoint 120(N) may also include one or more displays 126(N) and LDSPKR's 128(N) coupled to or integrated with the display 126(N). The video conference endpoints 120(1)-120(N) may be wired or wireless communication devices equipped with the aforementioned components, and may take on a variety of forms, such as, but not limited to, laptop and tablet computers, smartphones, IP phones, whiteboards, Kanban boards, etc. In a transmit direction, systems 104(1)-104(N) capture audio/video from their local participants 106 with one or more MA's/VC's, encode the captured audio/video into data packets, and transmit the data packets to other systems 104(1)-104(N) or to the conference server 102. In a receive direction, systems 104(1)-104(N) decode audio/video from data packets received from the conference server 102 or other systems 104(1)-104(N), and present the audio/video to their local participants 106 via the one or more LDSPKR's/displays.

Figure 2A:
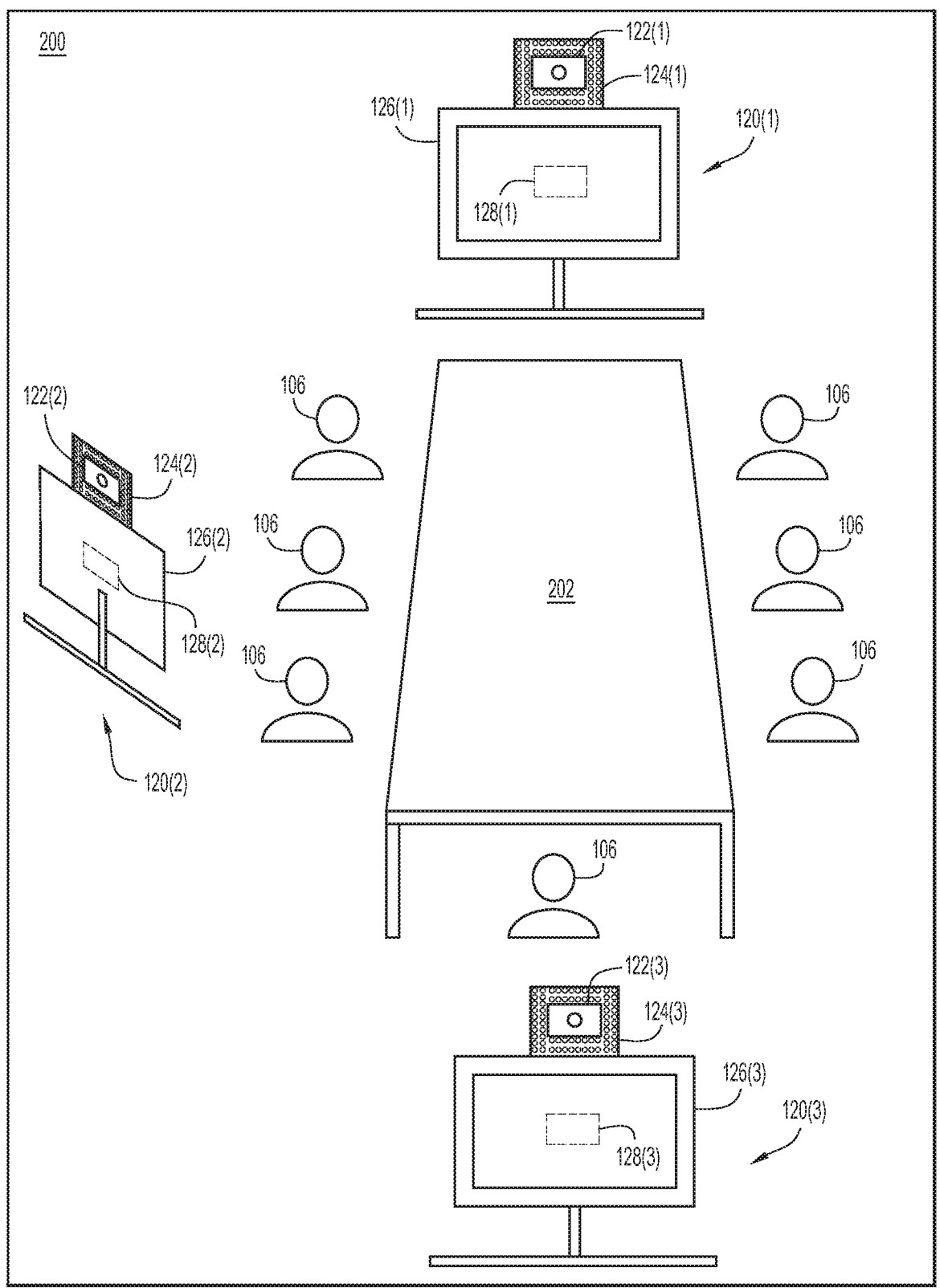
FIG. 2A is an illustration of video conference system deployed in a conference room in which the video conference system contains multiple video conference endpoints and in which there are multiple meeting participants sitting around a conference table, according to an example embodiment.

Referring now to FIG. 2A, there is an illustration of a primary or near-end video conference system 104(1) deployed in a conference room 200 (depicted simplistically as an outline in FIG. 2A), according to an embodiment. It is noted that the terms "primary video conference system" and "near-end video conference system" are used interchangeably herein. The near-end video conference system 104(1) includes three video conference endpoints 120(1)-120(3) positioned around the conference room 200. As previously explained, each of the video conference endpoints 120(1)-120(3) may be any type of wired or wireless communication device. Each of the displays 126(1)-126(3) of the video conference endpoints 120(1)-120(3), respectively, may be configured to simultaneously display content different from the content being displayed on the other displays 126(1)-126(3). Some of the displays 126(1)-126(3) may be configured to display content via display-only screens, while other displays 126(1)-126(3) may be configured to display content via interactive screens (e.g., a whiteboard display). In some embodiments, the LDSPKR's 128(1)-128(3) may be integrated with their respective display 126(1)-126(3) such that the LDSPKR's 128(1)-128(3) have a predetermined physical relationship with the displays 126(1)-126(3), respectively. While FIG. 2A illustrates the LDSPKR's 128(1)-128 (3) being disposed centrally on the displays 126(1)-126(4), it should be appreciated that the LDSPKR's 128(1)-128(3) may be disposed in any location within or around the edge/frame of the displays 126(1)-126(3), respectively.

As further illustrated in FIG. 2A, each of the video conference endpoints 120(1)-120(3) includes a VC 122(1)-122(3), respectively, and an MA 124(1)-124(3), respectively. In some embodiments, the MA's 124(1)-124(3) may be integrated with the VC's 122(1)-122(3), respectively. The VC's may each be operated under control of the near-end video conference system 104(1) to capture video of different views or scenes of multiple participants 106 disposed within the conference room 200. Moreover, each VC 122(1)-122(3) may be disposed in the conference room with a known predetermined physical relationship (e.g., a known position and orientation) with the displays 126(1)-126(3) of the respective video conference endpoint 120(1)-120(3). In some embodiments, the various components of an endpoint 120(1)-120(3) may be integrated together when sold, or may be configured after purchase to be physically attached to each other so as to have a predetermined physical relationship. Each of the VC's 122(1)-122(3) may include pan, tilt, and zoom (PTZ) features that may be implemented mechanically and/or digitally. Near-end video conference system 104(1) may control the pan, tilt, and zoom features of each of the VC's 122(1)-122(3) to capture video of different views/scenes of participants 106 within the conference room 200. In the embodiment illustrated, the participants 106 are seated around a conference table 202 around which the video conference endpoints 120(1)-120(3) are disposed. In other embodiments, the participants 106 may be standing in various locations within the conference room 200, or may be located proximate to the video conference endpoints 120(1)-120(3) within the conference room 200.

Figure 2B:
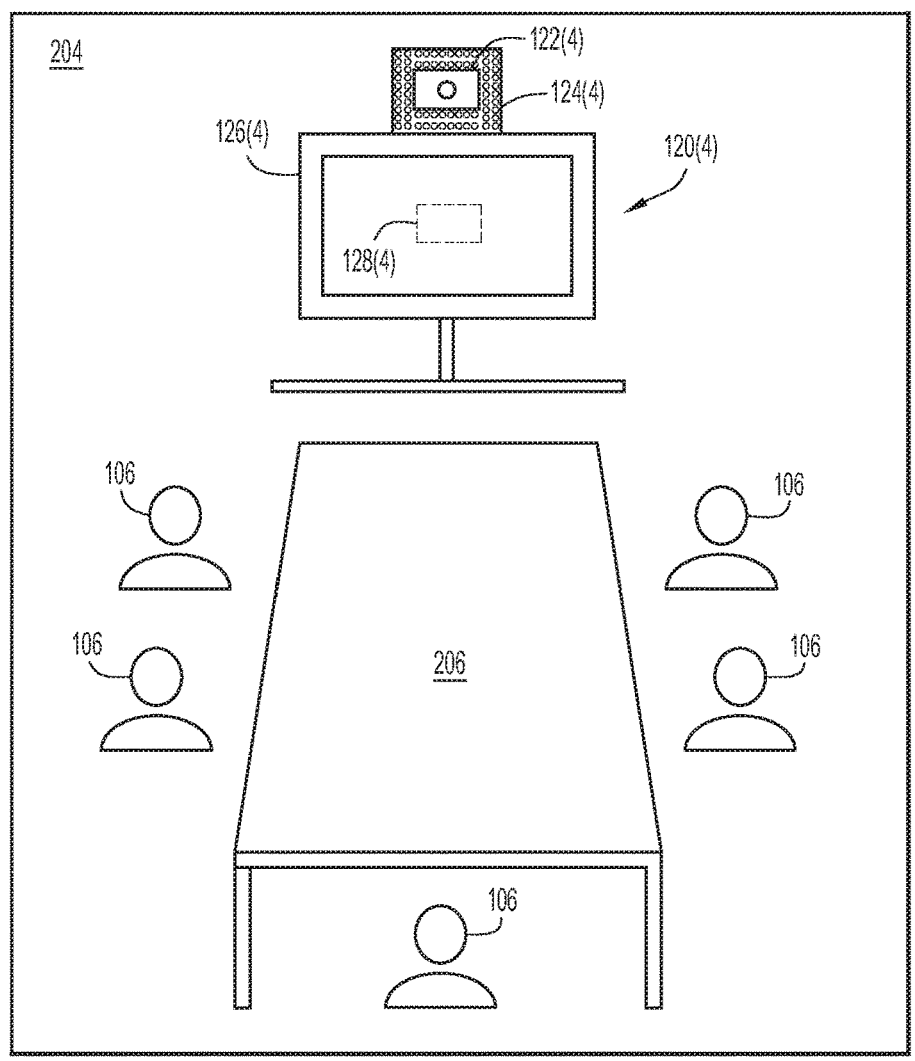
FIG. 2B is an illustration of another video conference system deployed in a conference room in which the video conference system contains a single video conference endpoint and in which there are multiple meeting participants sitting around a conference table, according to an example embodiment.

With reference to FIG. 2B, and continued reference to FIGS. 1 and 2A, illustrated is an example embodiment of a secondary or far-end video conference system 104(2) deployed in a conference room 204 (depicted simplistically as an outline in FIG. 2B), according to an embodiment. It is noted that the terms "secondary video conference system" and "far-end video conference system" are used interchangeably herein. Unlike the near-end video conference system 104(1) depicted in FIG. 2A, the far-end video conference system 104(2) includes a single video conference endpoint 120(4) positioned within the conference room 204. Similar to the video conference endpoints 120(1)-120(3) of the near-end video conference system 104(1), the video conference endpoint 120(4) may be any type of wired or wireless communication device. The video conference endpoint 120(4) may contain a VC 122(4), an MA 124(4), a display 126(4), and LDSPKR 128(4) similar to that of any of the video conference endpoints 120(1)-120(3) of the near-end video conference system 104(1). Thus, the embodiment of the far-end system 104(2) depicted in FIG. 2B may have only a single display 126(4) to display content provided by the near-end video conference system 104(1).

Figure 2C:
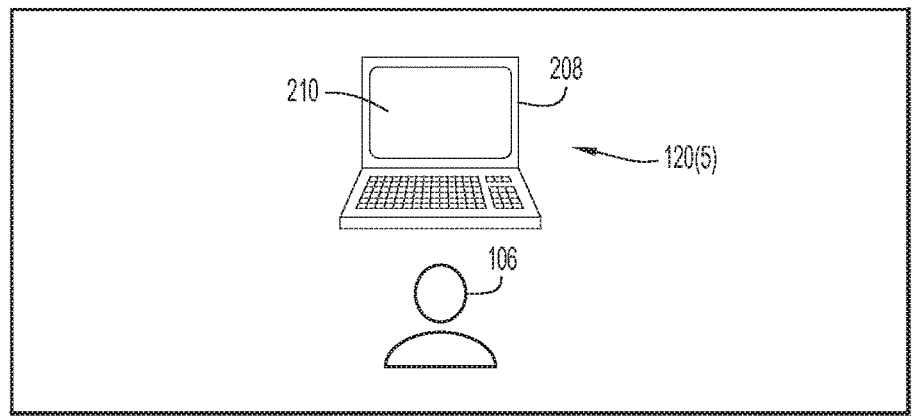
FIG. 2C is an illustration of another video conference system in which the video conference system contains a single video conference endpoint embodied as a personal computer and in which a single meeting participant is disposed within proximity of the video conference endpoint, according to an example embodiment.

With reference to FIG. 2C, and continued reference to FIGS. 1, 2A and 2B, illustrated is another example embodiment of far-end video conference system 104(2) deployed as a computer (e.g., a laptop computer), according to an embodiment. The embodiment depicted in FIG. 2C may represent a situation where participant 106 utilizes their computer 210 to connect to other participants 106 located at the near-end video conference system 104(1) to collaborate and conduct a video conference. As illustrated, the computer 208 of video conference system 104(2) is a video conference endpoint 120(5) with a single display 210 for displaying the content of the near-end video conference system 104(1). While not depicted, the computer 208 may be further equipped with a VC, an MA, and LDSPKR's.

Using the techniques presented herein, the near-end video conference system 104(1) utilizes the video conference endpoints 120(1)-120(3) to implement participant detection techniques (e.g., facial detection techniques, motion detection techniques, upper body detection techniques, audio detection techniques, etc.) to detect participants and their location with respect to each of the video conference endpoints 120(1)-120(3). In some embodiments, the near-end video conference system 104(1) may further use the video conference endpoints 120(1)-120(3) to implement gaze detection techniques to determine the head orientation of each participant with respect to each of the video conference endpoints 120(1)-120(3) based on the output of at least one of the VC's 122(1)-122(3) of the video conference endpoints 120(1)-120(3). After determining the head orientation of each participant with respect to the displays 126(1)-126(3) of each of the video conference endpoints 120(1)-120(3), respectively, the near-end video conference system 104(1) automatically defines/establishes the content presented on the displays 126(1)-126(3) that is being actively viewed by the participants 106 at the near-end video conference system 104(1). In other embodiments, the near end video conference system 104(1) may automatically define/establish the active content presented on the displays 126(1)-126(3) by using audio triangulation techniques or other location detection techniques (e.g., facial detection techniques, motion detection techniques, upper body detection techniques, etc.) to determine the location or proximity of the participants with respect to each of the displays 126(1)-126(3) of each of the video conference endpoints 120(1)-120(3). Once the active content has been determined, the near-end video conference system 104(1) may then send information to the far-end video conference systems 104(2)-104(N) that have less video conference endpoints 120(4)-120(5), and thus, less displays 126(1)-126(N), than that of the near-end video conference system 104(1) that indicates which content is the active content at the near-end video conference system 104(1). This enables the far-end video conference systems 104(2)-104(N) to automatically choose the content to display at the far-end video conference systems 104(2)-104(N).

Figure 3A:
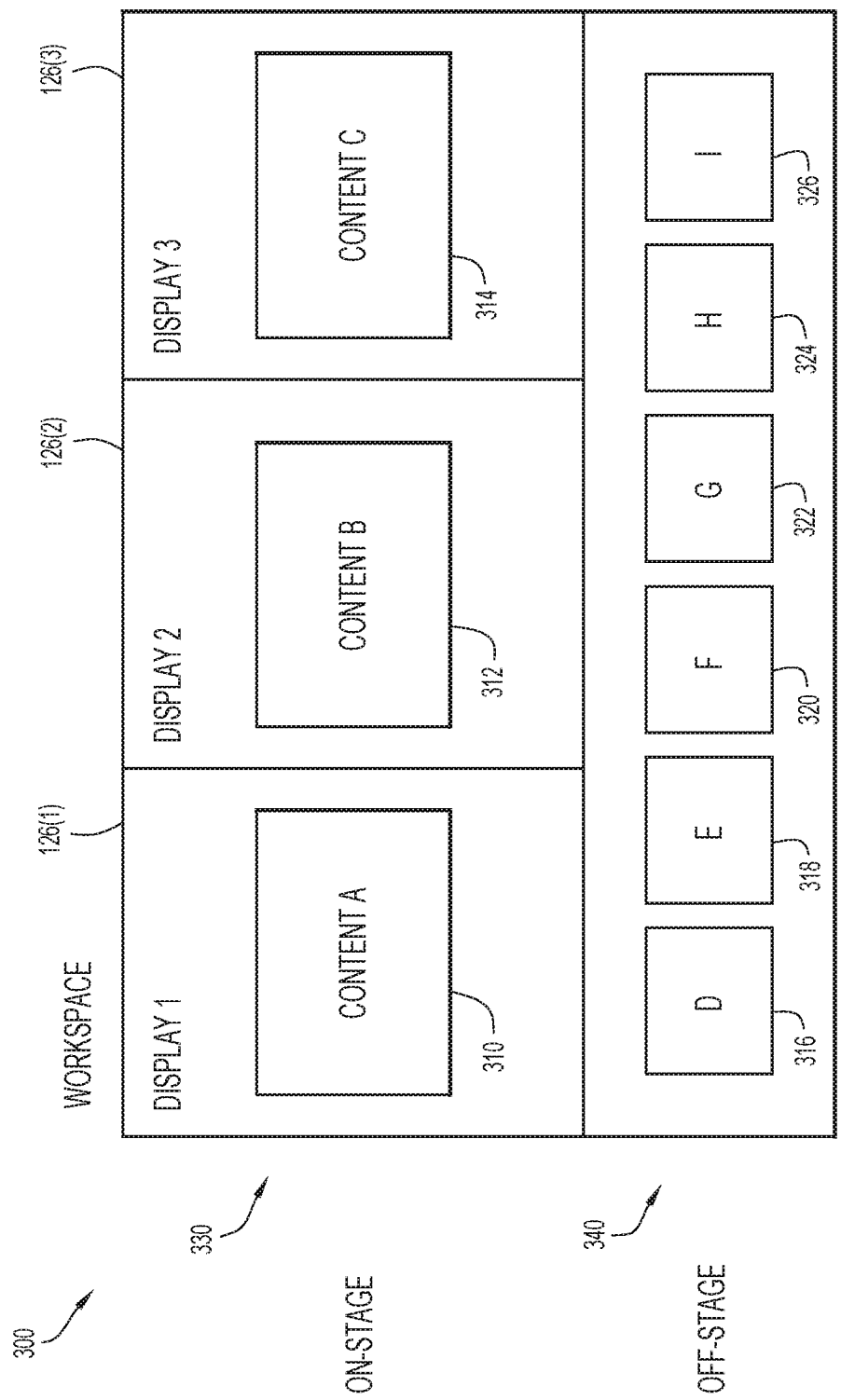
FIG. 3A is a diagram that illustrates an example of a workspace of a near-end video conference system, the workspace indicating various pieces of content that are emphasized and displayed and indicating various pieces of content that are deemphasized, according to an example embodiment.

With reference to FIG. 3A, and continued reference to FIGS. 1 and 2A-2C, illustrated is an example scenario of a "workspace" 300 of the near-end video conference system 104(1), which contains three displays 126(1)-126(3). The workspace 300 includes a plurality of different pieces of content 310, 312, 314, 316, 318, 320, 322, 324, 326 that may be shared with the far-end video conference systems 104(2)-104(N) during the video conference session. The displays 126(1)-126(3) are configured to display any of the content 310, 312, 314, 316, 318, 320, 322, 324, 326. As illustrated in FIG. 3A, the content 310, 312, 314, 316, 318, 320, 322, 324, 326 may be divided into groups of "on-stage" content 330, which is content that is emphasized and is being displayed on the displays 126(1)-126(3), and "off-stage" content 340, which is content that is deemphasized and may not be on display at the video conference system or may be displayed in a minimal or minimized manner (e.g., picture-in-picture) on the displays 126(1)-126(3). In the workspace 300, content A 310, content B 312, and content C 314 are classified as on-stage content 330, while content D 316, content E 318, content F 320, content G 322, content H 324, and content I 326 are classified as off-stage content 340. Thus, as illustrated in FIG. 3A, content A 310 is emphasized and presented on display 126(1), content B 312 is emphasized and presented on display 126(2), and content C is emphasized and presented on display 126(3). Meanwhile, contents D-I, 316, 318, 320, 322, 324, 326 are deemphasized. It should be understood that any content 310, 312, 314, 316, 318, 320, 322, 324, 326 may switched between being emphasized and deemphasized at the near-end video conference system 104(1).

Figure 3B:
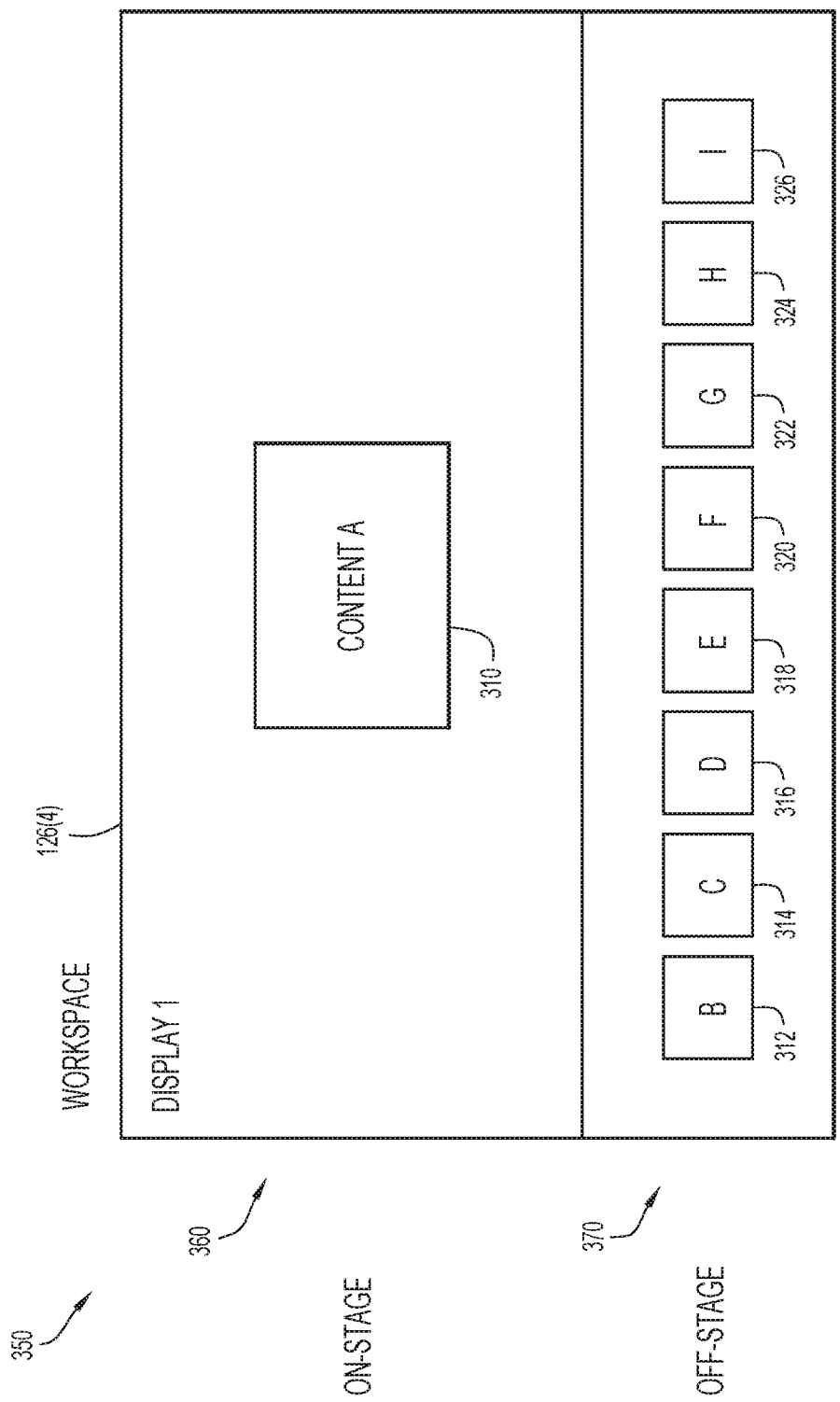
FIG. 3B is a diagram that illustrates an example of a workspace of a far-end video conference system, the workspace indicating a piece of content that is emphasized and displayed and indicating various pieces of content that are deemphasized, according to an example embodiment.

With reference to FIG. 3B, and continued reference to FIGS. 1, 2A-2C, and 3A, illustrated is an example scenario of a "workspace" 350 of a far-end video conference system 104(2), which contains only a single display 126(4). Because the far-end video conference system 104(2) connected to the near-end video conference system 104(1) during a video conferences, the workspace 350 includes the same plurality of different pieces of content 310, 312, 314, 316, 318, 320, 322, 324, 326 that are included in the workspace 300 of the near-end video conference system 104(1). The display 126(4) is configured to display any of the content 310, 312, 314, 316, 318, 320, 322, 324, 326. As illustrated in FIG. 3B, the content 310, 312, 314, 316, 318, 320, 322, 324, 326 is divided into groups of "on-stage" content 360, which is content that is emphasized and is being displayed on the single display 126(4), and "off-stage" content 370, which is content that is deemphasized and may not be on display at the video conference system or may be displayed in a minimal or minimized manner (e.g., picture-in-picture) on the single display 126(4). In the workspace 350, content A 310 is classified as on-stage content 360, while content B 312, content C 314, content D 316, content E 318, content F 320, content G 322, content H 324, and content I 326 are classified as off-stage content 370. As illustrated in FIG. 3B, content A 310 is emphasized and presented on display 126(4). Meanwhile, contents B-I, 312, 314, 316, 318, 320, 322, 324, 326 are deemphasized. Thus, as illustrated in FIGS. 3A and 3B, the on-stage content 330 of the near-end video conference system 104(1) differs from the on-stage content 360 of the far-end video conference system 104(2) because the number of displays differs between the two systems 104(1), 104(2). It should be understood that any content 310, 312, 314, 316, 318, 320, 322, 324, 326 may be switched between being emphasized and deemphasized at the far-end video conference system 104(2).

With reference to FIG. 4, and continued reference to FIGS. 1, 2A-2C, and 3A-3B, illustrated is an overhead view of a participant 106 within a field of view 400 of a VC 122. As previously explained, the head orientations of the participants 106 may be one technique used to determine the active content of the near-end video conference system 104(1). FIG. 4 illustrates the various head orientation zones of a participant 106 with respect to a VC 122. The first zone 410 is where the participant 106 is looking either straight at the VC 122, or in the general direction of the VC 122. In some embodiments, the first zone 410 may span from a head orientation offset −15 degrees from the direction of the VC 122 to a head orientation offset +15 degrees from the direction of the VC 122. The second zones 420(1), 420(2) are the head orientations of the participant 106, where the participant 106 is looking slightly to the side of the VC 122. Second zone 420(1) may span from a head orientation being offset +15 degrees to being offset +60 degrees from the direction of the VC 122, while second zone 420(2) may span from a head orientation being offset −15 degrees to being offset −60 degrees from the direction of the VC 122. The third zones 430(1), 430(2) are the head orientations of the participant 106, where the participant 106 is looking farther to the side of the VC 122, and thus, the head orientation of the participant 106 is rotated farther away from the VC 122 than the first and second zones 410, 420(1), 420(2). Third zone 430(1) may span from a head orientation being offset +60 degrees to being offset +90 degrees from the direction of the VC 122, while third zone 430(2) may span from a head orientation being offset −60 degrees to being offset −90 degrees from the direction of the VC 122. The fourth zone 440 are the head orientations of the participant 106 where the participant is looking away from the VC 122. Thus, the fourth zone 440 spans from a head orientation being offset +90 degrees from the direction of the VC 122 to being offset +180 degrees and facing directly away from the direction of the VC 122, while also spanning from being offset −90 degrees from the direction of the VC 122 to being offset −180 degrees and facing directly away from the direction of the VC 122. FIG. 4 merely illustrates one example of the head orientation zones, and it should be appreciated that any number of zones may be implemented.

The near-end video conference system 104(1), when measuring the head orientations of a participant 106 and determining the active content of the near-end video conference system 104(1), may assign each head orientation a score based on the zone 410, 420(1), 420(2), 430(1), 430(2), 440 in which the head orientations are located. In some embodiments, the scores for the head orientations may range from 0.00 to 1.00. For example, with head orientations of the participant 106 that are in the first zone 410, the head orientations may be assigned a score of 1.00. Head orientations of the participant 106 that are in either of the second zones 420(1), 420(2) may be assigned a score of 0.50, while head orientations of the participant 106 that are in either of the third zones 430(1), 430(2) may be assigned a score of 0.25. It then follows that head orientations of the participant 106 that are in the fourth zone 440 may be assigned a score of 0.00.

Figure 5:
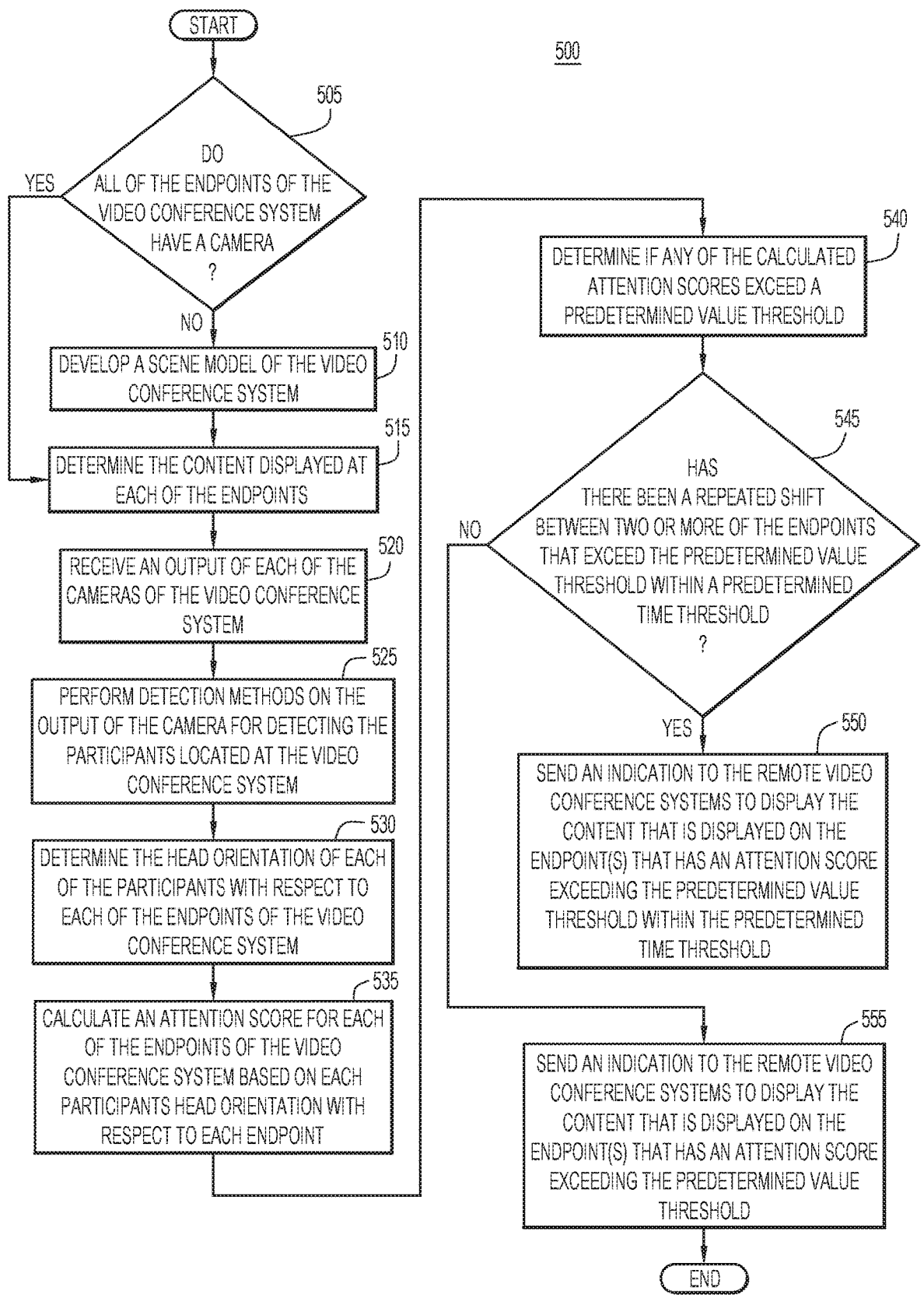
FIG. 5 is a flowchart depicting the techniques for determining the active content of the near-end video conference system based on head orientations of participants, according to an example embodiment.

With reference to FIG. 5, and continued reference to FIGS. 1, 2A-2C, 3A-3B, and 4, illustrated is one embodiment of the techniques 500 performed by the near-end video conference system 104(1) to select the active content (i.e., the content which is receiving the most attention at a current moment in time or time span during a conference session) of the near-end video conference system 104(1) based on the head orientations of the participants and send an indication to the far-end video conference systems 104(2)-104(N) of the active content to enable the far-end video conference systems 104(2)-104(N) to display the active content. At 505, the near-end video conference system 104(1) determines whether each of the video conference endpoints 120(1)-120(N) located at the near-end video conference system 104(1) contains a VC 122(1)-122(N), respectively. If, at 505, the near-end video conference system 104(1) determines that not every video conference endpoint 120(1)-120(N) contains a VC 122(1)-122(N), respectively, then the near-end video conference system 104(1), at 510, develops a scene model of the video conference endpoint 120(1)-120(N) at the near-end video conference system 104(1). At 510, so long as at least one video conference endpoint 120(1)-120(N) contains a VC, the near-end video conference system 104(1) may determine a scene model by determining the position and orientation of each of endpoints 120(1)-120(N) with respect to each other, and especially with respect to the endpoint with the VC. The positions and orientations of the endpoints 120(1)-120(N) may be manually entered by a participant, or may be detected by using sensors (e.g., radar, ultrasound triangulation, etc.).

Once the scene model has been developed at 510, or if, at 505, it was determined that all of the endpoints 120(1)-120(N) contained a VC 122(1)-122(N), respectively, then, at 515, the near-end video conference system 104(1) determines which content is displayed or presented on each of the displays 126(1)-126(N) of the endpoints 120(1)-120(N), respectively. As previously described and illustrated in FIG. 3A, the on-stage content 330 may be emphasized and displayed on the displays 126(1)-126(N) of the endpoints 120(1)-120(N), respectively, while the off-stage content 340 may be deemphasized. At 520, the near-end video conference system 104(1) receives the outputs of each of the VC's 120(1)-120(N) of the near-end video conference system 104(1). At 525, the near-end video conference system 104(1) performs detection methods on each of the outputs of the VC's 120(1)-120(N) received at 520. The near-end video conference system 104(1) utilizes participant detection techniques (e.g., facial detection techniques, motion detection techniques, upper body detection techniques, etc.) to detect participants and their location with respect to each of the video conference endpoints 120(1)-120(N) of the near-end video conference system 104(1). In the event not every endpoint 120(1)-120(N) of the near-end video conference system 104(1) contains a VC 122(1)-122(N), the near-end video conference system 104(1) performs participant detection techniques on the received VC output(s) and determines the participants locations with respect to each of the endpoints 120(1)-120(N) with the assistance of the scene model (e.g., the known positions and orientations of the endpoints 120(1)-120(N) with respect to one another) developed at 510. Conversely, when each of the endpoints 120(1)-120(N) of the near-end video conference system 104(1) contains a VC 122(1)-122(N), the near-end video conference system 104(1) performs participant detection techniques on the multiple VC outputs and determines the locations of the participants 106 with respect to each of the endpoints 120(1)-120(N) via the VC output of that respective endpoint 120(1)-120(N).

At 530, the near-end video conference system 104(1) then utilizes gaze detection techniques to determine the head orientation of each of the detected participants with respect to each of the video conference endpoints 120(1)-120(N). Similar to the participant detection techniques, if not every endpoint 120(1)-120(N) of the near-end video conference system 104(1) contains a VC 122(1)-122(N), respectively, then the near-end video conference system 104(1) performs gaze detection techniques on the received VC output(s) and determines the head orientation of each participant with respect to each of the endpoints 120(1)-120(N) with the assistance of the scene model (e.g., the known positions and orientations of the endpoints 120(1)-120(N) with respect to one another) developed at 510. However, if each of the endpoints 120(1)-120(N) of the near-end video conference system 104(1) contains a VC 122(1)-122(N), the near-end video conference system 104(1) may perform gaze detection techniques on each of the received VC outputs and determines the head orientation of the participants 106 with respect to each of the endpoints 120(1)-120(N) via the VC output of that respective endpoint 120(1)-120(N). After completing the step at 530, the near-end video conference system 104(1) will have determined multiple head orientations for each participant 106, one for each of the endpoints 120(1)-120(N) of the near-end video conference system 104(1). Thus, if the near-end video conference system 104(1) contains three endpoints 120(1)-120(3), then the near-end video conference system 104(1) will have determined three head orientations for each participant 106.

At 535, the near-end video conference system 104(1) then calculates the attention score for each of the endpoints 120(1)-120(N) of the near-end video conference system 104(1), and thus, for the content being displayed at each of the endpoints 120(1)-120(N). The attention scores are calculated based on the head orientations of the participants 106 that were determined at 530. The head orientation of each participant 106 with respect to each endpoint 120(1)-120(N) is given a score based on which zone (e.g., 410, 420(1), 420(2), 430(1), 430(2), 440) the head orientation measures for that given endpoint 120(1)-120(N). The attention scores of each participant 106 for a given endpoint 120(1)-120(N) are then summed. At 540, the near-end video conference system 104(1) then determines which accumulated attention scores for the endpoints 120(1)-120(N) exceed a predetermined value threshold. In some embodiments, the predetermined value threshold may be an attention score that exceeds a set value, while in other embodiments, the predetermined value threshold may be set as attention scores that exceed half of the highest calculated attention score.

At 545, the near-end video conference system 104(1) then determines if, within a predetermined time threshold or predetermined period of time, there was a repeated back and forth shift in the attention scores that exceed the predetermined value threshold. At 545, the near-end video conference system 104(1) may determine if the participants 106 at the near-end video conference system 104(1) are discussing two or more separate pieces of content, and thus, the attention scores of the two or more pieces of content shift back and forth repeatedly in exceeding the predetermined value threshold. If the near-end video conference system 104(1) determines there is a repeated shift between two or more pieces of content that exceed the predetermined value threshold, then, the near-end video conference system 104(1) may determine that the two or more pieces of content are relevant to the conference and should be displayed at the far-end video conference systems 104(2)-104(N) despite one of the pieces of content currently being below the predetermined value threshold. If, at 545, the near-end video conference system 104(1) determines there is a repeated back and forth shift, then, at 550, the near-end video conference system 104(1) sends an indication to each of the far-end video conference systems 104(1)-104(N) of multiple pieces of content that had repeatedly shifted in exceeding the predetermined value threshold within a predetermined time threshold. However, if, at 545, the near-end video conference system 104(1) determines there is not a repeated back and forth shift, then, at 555, the near-end video conference system 104(1) sends an indication to each of the far-end video conference systems 104(1)-104(N) of only the pieces of content that are currently exceeding the predetermined value threshold at 540. The indications at 550 and 555 enable the far-end video conference systems 104(2)-104(N) to determine which content of the video conference session to emphasize to on-stage content and display on their displays.

With reference to FIGS. 6A-6C, and continued reference to FIGS. 1, 2A-2C, 3A-3B, 4, and 5, illustrated are views of a near-end video conference system 104(1) with three endpoints 120(1)-120(3) and the simultaneous view of the content being displayed at far-end video conference system 104(2) that is in the form of the computer 208 having a single display 210. As illustrated in FIGS. 6A-6C, the video conference endpoints 120(1)-120(3) are disposed around the conference room 200. Each of the video conference endpoints 120(1)-120(3) of the near-end video conference system 104(1) has a VC 122(1)-122(3), respectively, and a display 126(1)-126(3), respectively. It is to be assumed in the discussion of FIGS. 6A-6C, that each of the displays 126(1)-126(3) of the video conference endpoints 120(1)-120(3) are displaying different content from one another. Furthermore, it is to be assumed in the discussion of FIGS. 6A-6C, that each head orientation is given a score on a scale of 1.00 to 0.00, where 1.00 is a head orientation that is straight at an endpoint, and 0.00 is a head orientation that is looking away from the endpoint, as explained in detail with respect to FIG. 4.

As illustrated in FIG. 6A, three participants 106(1)-106(3) are located at the near-end video conference system 104(1). The three participants 106(1)-106(3) are positioned close to one another. Moreover, each of the three participants 106(1)-106(3) is directly facing the second video conference endpoint 120(2), and thus, viewing the content displayed on the second display 126(2) on the second video conference endpoint 120(2) of the near-end video conference system 104(1). Thus, in this scenario, and in accordance with the techniques depicted in FIG. 5, the near-end video conference system 104(1) may determine that because each of the participants 106(1)-106(3) is directly viewing the second display 126(2) of the second endpoint 120(2), and because the participants 106(1)-106(3) are not viewing the first and third displays 126(1), 126(3) of the first and third endpoints 120(1), 120(3), respectively, the second endpoint 120(2), and thus, the content displayed at the second endpoint 120(2), would receive the highest attention score. For example, the first endpoint 120(1) would receive a total attention score of 0.00 as depicted in the following equation:

$$A(120(1))=0.00(106(1))+0.00(106(2))+0.00(106(3))$$
$$=0.00$$

The second endpoint 120(2) would receive a total attention score of 3.00 as depicted in the following equation:

$$A(120(2))=1.00(106(1))+1.00(106(2))+1.00(106(3))$$
$$=3.00$$

The third endpoint 120(3) would receive a total attention score of 0.00 as depicted in the following equation:

$$A(120(3))=0.00(106(1))+0.00(106(2))+0.00(106(3))$$
$$=0.00$$

Given the following attention scores, the near-end video conference system 104(1) would send an indication to the far-end video conference system 104(2) that the content of the second video conference endpoint 120(2) is the current active content and should be displayed. As illustrated in FIG. 6A, the content of the second video conference endpoint 120(2) is then displayed on the display 210 of the far-end video conference system 104(2).

As illustrated in FIG. 6B, three participants 106(1)-106(3) are located at the near-end video conference system 104(1). The three participants 106(1)-106(3) are positioned close to one another and in proximity to the second video conference endpoint 120(2). However, each of the three participants 106(1)-106(3) is directly facing the first video conference endpoint 120(1), and thus, viewing the content displayed on the first display 126(1) of the first video conference endpoint 120(1). Thus, in this scenario, and in accordance with the techniques depicted in FIG. 5, the near-end video conference system 104(1) may determine that because each of the participants 106(1)-106(3) is directly viewing the first display 126(1) of the first endpoint 120(1), and because the participants 106(1)-106(3) are not viewing the second and third displays 126(2), 126(3) of the second and third endpoints 120(2), 120(3), respectively, the first endpoint 120(1), and thus, the content displayed at the first endpoint 120(1), would receive the highest attention score. For example, the first endpoint 120(1) would receive a total attention score of 3.00 as depicted in the following equation:

$$A(120(1))=1.00(106(1))+1.00(106(2))+1.00(106(3))$$
$$=3.00$$

The second endpoint 120(2) would receive a total attention score of 0.00 as depicted in the following equation:

$$A(120(2))=0.00(106(1))+0.00(106(2))+0.00(106(3))$$
$$=0.00$$

The third endpoint 120(3) would receive a total attention score of 0.00 as depicted in the following equation:

$$A(120(3))=0.00(106(1))+0.00(106(2))+0.00(106(3))$$
$$=0.00$$

Given the following attention scores, the near-end video conference system 104(1) would send an indication to the far-end video conference system 104(2) that the content of the first video conference endpoint 120(1) is the current active content and should be displayed. As illustrated in FIG. 6B, the content of the first video conference endpoint 120(1) is then displayed on the display 210 of the far-end video conference system 104(2).

As illustrated in FIG. 6C, three participants 106(1)-106(3) are located at the near-end video conference system 104(1). The three participants 106(1)-106(3) are positioned around a conference table 202 located within the conference room 200 of the near-end video conference system 104(1). As illustrated, the three participants 106(1)-106(3) are directly facing the third video conference endpoint 120(3), and thus, viewing the content displayed on the third display 126(3) of the third video conference endpoint 120(3). Thus, in this scenario, and in accordance with the techniques depicted in FIG. 5, the near-end video conference system 104(1) may determine that because each of the participants 106(1)-106(3) is directly viewing the third display 126(3) of the third endpoint 120(3), and because the participants 106(1)-106(3) are not directly viewing the first and second displays 126(1), 126(2) of the first and second endpoints 120(1), 120(2), respectively, the third endpoint 120(3), and thus, the content displayed at the third endpoint 120(3), would receive the highest attention score. For example, the first endpoint 120(1) would receive a total attention score of 0.00 as depicted in the following equation:

$$A(120(1))=0.00(106(1))+0.00(106(2))+0.00(106(3))$$
$$=0.00$$

The second endpoint 120(2) would receive a total attention score of 0.35 as depicted in the following equation:

$$A(120(2))=0.25(106(1))+0.00(106(2))+0.10(106(3))$$
$$=0.35$$

While the first and third participants 106(1), 106(3) are directly facing the third endpoint 120(3), because of their positioning in the room with respect to the other endpoints 120(1), 120(2), the first and third participants 106(1), 106(3) may have head orientations with respect to the second endpoint 120(2) that demonstrate that the participants 106(1), 106(3) are capable of at least partially viewing the second endpoint 120(2). The third endpoint 120(3) would receive a total attention score of 3.00 as depicted in the following equation:

$$A(120(3))=1.00(106(1))+1.00(106(2))+1.00(106(3))$$
$$=3.00$$

Given the following attention scores, the near-end video conference system 104(1) would send an indication to the far-end video conference system 104(2) that the content of the third video conference endpoint 120(3) is the current active content and should be displayed. As illustrated in FIG. 6C, the content of the third video conference endpoint 120(3) is then displayed on the display 210 of the far-end video conference system 104(2).

With reference to FIG. 7, and continued reference to FIGS. 1, 2A-2C, 3A-3B, 4, and 5, illustrated is a view of a near-end video conference system 104(1) with three endpoints 120(1)-120(3) and a simultaneous view of the content being displayed at far-end video conference system 104(2) that is in the form of the computer 208 having a single display 210. As illustrated in FIG. 7, the video conference endpoints 120(1)-120(3) are positioned around the conference room 200. Each of the video conference endpoints 120(1)-120(3) of the near-end video conference system 104(1) has a VC 122(1)-122(3), respectively, and a display 126(1)-126(3), respectively. Each of the displays 126(1)-126(3) of the video conference endpoints 120(1)-120(3) illustrated in FIG. 7 may be displaying different content from one another. Furthermore, it is to be assumed that each head orientation is given a score on a scale of 1.00 to 0.00, where 1.00 is a head orientation that is straight at an endpoint, and 0.00 is a head orientation that is looking away from the endpoint, as explained in detail with respect to FIG. 4.

As illustrated in FIG. 7, six participants 106(1)-106(6) are located at the near-end video conference system 104(1). The first participant 106(1) is located to the side of the first video conference endpoint 120(1) and is looking across the conference room 200 in the direction of the third video conference endpoint 120(3). Participants 106(2)-106(6) may be disposed proximate to one another and proximate to the third video conference endpoint 120(3). As illustrated, the second participant 106(2) is looking to the side of the second video conference endpoint 120(2), while participants 106(3)-106(6) are looking in the general direction of the first participant 106(1) and the first video conference endpoint 120(1). Thus, in this scenario, and in accordance with the techniques depicted in FIG. 5, the near-end video conference system 104(1) may determine that because most of the participants 106(3)-106(6) are looking toward the first video conference endpoint 120(1), because only the first participant 106(1) is looking toward the third video conference endpoint 120(3), and because only the second participant 106(2) is generally looking toward the second video conference endpoint 120(2), the first endpoint 120(1), and thus, the content displayed at the first endpoint 120(1), would receive the highest attention score.

For example, the first endpoint 120(1) would receive a total attention score of 4.00 as depicted in the following equation:

$$A(120(1))=0.00(106(1))+0.40(106(2))+0.80(106(3))+\\1.00(106(4))+0.80(106(5))+1.00(106(6))=4.00$$

While the second participant 106(2) is generally facing the second endpoint 120(2), because of the positioning the second participant's 106(2) position within the room with respect to the first endpoint 120(1), the second participant 106(2) may have a head orientation that demonstrates that the first endpoint 120(1) is at least partially within view of the second participant 106(2). Thus, the first endpoint 120(1) receives a partial attention score with respect to the head orientation of the second participant 106(2). Furthermore, while the third and fifth participants 106(3), 106(5) are generally facing the first endpoint 120(1), the third and fifth participants 106(3), 106(5) may not be directly facing the VC 122(1) of the first endpoint 120(1), and may instead be directly facing the first participant 106(1) standing next to the first endpoint 120(1). Thus, the first endpoint 120(1) receives a partial attention score with respect to the head orientations of the third and fifth participants 106(3), 106(5), but the partial attention scores are greater than that of the second participant 106(2).

The second endpoint 120(2) would receive a total attention score of 1.30 as depicted in the following equation:

$$A(120(1))=0.40(106(1))+0.60(106(2))+0.00(106(3))+\\0.10(106(4))+0.00(106(5))+0.20(106(6))=1.30$$

While the first, fourth, and sixth participants 106(1), 106(4), 106(6) are generally facing the first endpoint 120(1), because of the positioning of the first, fourth, and sixth participants 106(1), 106(4), 106(6) in the room with respect to the second endpoint 120(2), the first, fourth, and sixth participants 106(1), 106(4), 106(6) may have head orientations that demonstrates that the second endpoint 120(2) is still at least partially within view of the first, fourth, and sixth participants 106(1), 106(4), 106(6). Thus, the second endpoint 120(2) receives a partial attention score with respect to the head orientation of the first, fourth, and sixth participants 106(1), 106(4), 106(6). Furthermore, while the second participant 106(2) is generally facing the second endpoint 120(2), the second participant 106(2) may not be facing directly into the VC 122(2) of the second endpoint 120(2), and may instead be looking off to the side of the second endpoint 120(2). Thus, the second endpoint 120(2) receives a partial attention score with respect to the head orientation of the second participant 106(2) that is greater than that of the first, fourth, and sixth participants 106(1), 106(4), 106(6) because the head orientations of the first, fourth, and sixth participants 106(1), 106(4), 106(6) are more offset from the second endpoint 120(2) than the second participant 106(2).

Furthermore, the third endpoint 120(3) would receive a total attention score of 1.00 as depicted in the following equation:

$$A(120(1))=1.00(106(1))+0.00(106(2))+0.00(106(3))+\\0.00(106(4))+0.00(106(5))+0.00(106(6))=1.00$$

Given the following attention scores, the near-end video conference system 104(1) would send an indication to the far-end video conference system 104(2) that the content of the first video conference endpoint 120(1) is the current active content and should be displayed. As illustrated in FIG. 7, the content of the first video conference endpoint 120(1) is then displayed on the display 210 of the far-end video conference system 104(2).

With reference to FIG. 8, and continued reference to FIGS. 1, 2A-2C, 3A-3B, 4, and 5, illustrated is a view of a near-end video conference system 104(1) with three endpoints 120(1)-120(3) and a simultaneous view of the content being displayed at far-end video conference system 104(2) that is in the form of the computer 208 having a single display 210. As illustrated in FIG. 8, the video conference endpoints 120(1)-120(3) are positioned around the conference room 200. Each of the video conference endpoints 120(1)-120(3) of the near-end video conference system 104(1) has a VC 122(1)-122(3), respectively, and a display 126(1)-126(3), respectively. Each of the displays 126(1)-126(3) of the video conference endpoints 120(1)-120(3) illustrated in FIG. 8 may be displaying different content from one another. Furthermore, it is to be assumed that each head orientation is given a score on a scale of 1.00 to 0.00, where 1.00 is a head orientation that is straight at an endpoint, and 0.00 is a head orientation that is looking away from the endpoint, as explained in detail with respect to FIG. 4.

As illustrated in FIG. 8, five participants 106(1)-106(5) are located at the near-end video conference system 104(1). Participants 106(1)-106(3) are located proximate to, and looking directly at, the first video conference endpoint 120(1). Meanwhile, participants 106(4)-106(5) are located proximate to, and looking directly at, the second video conference endpoint 120(2). If, in accordance with the techniques depicted in FIG. 5, the predetermined value threshold for awarding content as being active content is an attention score that exceeds 50% of the maximum awarded attention score, then, in this scenario, both the content of the first video conference endpoint 120(1) and the content of the second video conference endpoint 120(2) would awarded as being active content for near-end video conference system 104(1). The near-end video conference system 104(1) may determine that because three of the participants 106(1)-106(3) are looking toward the first video conference endpoint 120(1), and because two of the participants 106(4)-106(5) are looking toward the second video conference endpoint 120(2), both the content of the first endpoint 120(1) and the content of the second endpoint 120(2) should be awarded as the active content. For example, the first endpoint 120(1) would receive a total attention score of 3.00 as depicted in the following equation:

$$A(120(1))=1.00(106(1))+1.00(106(2))+1.00(106(3))+\\0.00(106(4))+0.00(106(5))=3.00$$

The second endpoint 120(2) would receive a total attention score of 2.00 as depicted in the following equation:

$$A(120(1))=0.00(106(1))+0.00(106(2))+0.00(106(3))+\\1.00(106(4))+1.00(106(5))=2.00$$

The third endpoint 120(3) would receive a total attention score of 0.00 as depicted in the following equation:

$$A(120(1))=0.00(106(1))+0.00(106(2))+0.00(106(3))+\\0.00(106(4))+0.00(106(5))=0.00$$

If the predetermined value threshold for awarding content as active content is an attention score exceeding 50% of the highest awarded attention score, then, given the following attention scores, the near-end video conference system 104(1) would send an indication to the far-end video conference system 104(2) that the content of both the first and second video conference endpoints 120(1), 120(2) are the current active content and both pieces of content should be displayed. The score of 2.00 of the second video conference endpoint 120(2) is less than the score of 3.00 of the first video conference endpoint 120(3), but more than half of the score of the first video conference endpoint 120(3). In other embodiments, the predetermined value threshold may be set to any value, be it a set score or a percentage of another attention score. As illustrated in FIG. 8, the content of the first video conference endpoints 120(1) and the content of the second video conference endpoint 120(2) are then simultaneously displayed side-by-side on the display 210 of the far-end video conference system 104(2).

With reference to FIGS. 9A-9C, and continued reference to FIGS. 1, 2A-2C, 3A-3B, 4, and 5, illustrated are views of a near-end video conference system 104(1) with two side-by-side endpoints 120(1)-120(2) and the simultaneous view of the content being displayed at far-end video conference system 104(2) that is in the form of the computer 208 having a single display 210. As illustrated in FIGS. 9A-9C, the video conference endpoints 120(1)-120(2) are disposed side-by-side in the conference room 200. Each of the video conference endpoints 120(1)-120(2) of the near-end video conference system 104(1) has a VC 122(1)-122(2), respectively, and a display 126(1)-126(2), respectively. It is to be assumed in the discussion of FIGS. 9A-9C that each of the displays 126(1)-126(2) of the video conference endpoints 120(1)-120(2) are displaying different content from one another. Furthermore, it is to be assumed in the discussion of FIGS. 9A-9C that each head orientation is given a score on a scale of 1.00 to 0.00, where 1.00 is a head orientation that is straight at an endpoint, and 0.00 is a head orientation that is looking away from the endpoint, as explained in detail with respect to FIG. 4.

As illustrated in FIG. 9A, three participants 106(1)-106(3) are located centrally within the conference room 200 of the near-end video conference system 104(1) and are positioned close to one another. Moreover, each of the three participants 106(1)-106(3) is directly facing the first video conference endpoint 120(1), and thus, viewing the content displayed on the first display 126(1) on the first video conference endpoint 120(1). However, because the endpoints 120(1)-120(2) are located side-by-side to one another and relatively close proximity to one another, the second video conference endpoint 120(2) may be at least partially in view of the participants 106(1)-106(3). Thus, in this scenario, and in accordance with the techniques depicted in FIG. 5, the near-end video conference system 104(1) may determine that because each of the participants 106(1)-106(3) is directly facing the first display 126(1) of the first endpoint 120(1), and only partially facing the second display 126(2) of the second endpoint 120(2), the first endpoint 120(1), and thus, the content displayed at the first endpoint 120(1), would receive the highest attention score. For example, the first endpoint 120(1) would receive a total attention score of 3.00 as depicted in the following equation:

$$A(120(1))=1.00(106(1))+1.00(106(2))+1.00(106(3))\\=3.00$$

The second endpoint 120(2) would receive a total attention score of 0.80 as depicted in the following equation:

$$A(120(2))=0.30(106(1))+0.25(106(2))+0.25(106(3))\\=0.80$$

Given the following attention scores, the near-end video conference system 104(1) would send an indication to the far-end video conference system 104(2) that the content of the first video conference endpoint 120(1) is the current active content and should be displayed. As illustrated in FIG. 9A, the content of the first video conference endpoint 120(1) is then displayed on the display 210 of the far-end video conference system 104(2).

As illustrated in FIG. 9B, similar to that of FIG. 9A, three participants 106(1)-106(3) are located centrally within the conference room 200 of the near-end video conference system 104(1) and are positioned close to one another. However, each of the three participants 106(1)-106(3) is directly facing the second video conference endpoint 120(2), and only partially viewing the first video conference endpoint 120(1). Thus, the participants 106(1)-106(3) are directly viewing the content displayed on the second display 126(2), while only partially viewing the content on the first display 126(1). Thus, in this scenario, and in accordance with the techniques depicted in FIG. 5, the near-end video conference system 104(1) may determine that because each of the participants 106(1)-106(3) is directly facing the second display 126(2) of the second endpoint 120(2), and only partially facing the first display 126(1) of the first endpoint 120(1), the second endpoint 120(2), and thus, the content displayed at the second endpoint 120(2), would receive the highest attention score. For example, the first endpoint 120(1) would receive a total attention score of 0.80 as depicted in the following equation:

$$A(120(1))=0.30(106(1))+0.25(106(2))+0.25(106(3))\\=0.80$$

The second endpoint 120(2) would receive a total attention score of 3.00 as depicted in the following equation:

$$A(120(2))=1.00(106(1))+1.00(106(2))+1.00(106(3))\\=3.00$$

Given the following attention scores, the near-end video conference system 104(1) would send an indication to the far-end video conference system 104(2) that the content of the second video conference endpoint 120(2) is the current active content and should be displayed. As illustrated in FIG. 9B, the content of the second video conference endpoint 120(2) is then displayed on the display 210 of the far-end video conference system 104(2).

As illustrated in FIG. 9C, similar to that of FIGS. 9A and 9B, three participants 106(1)-106(3) are located centrally within the conference room 200 of the near-end video conference system 104(1) and are positioned close to one another. However, FIG. 9C illustrates that the three participants 106(1)-106(3) are switching their attention back and forth between the first display 126(1) of the first video conference endpoint 120(1) and the second display 126(2) of the second video conference endpoint 120(2). As previously explained with regard to the techniques depicted in FIG. 5, if the attention of the participants 106(1)-106(3) repeatedly shift back and forth between two or more endpoints within a predetermined time threshold (e.g., a switch of attention every third minute), than the pieces of content displayed on the endpoints that receive the back and forth switching of attention are awarded as being active content. As illustrated in FIG. 9C, because the participants 106(1)-106(3) are switching their attention between endpoints 120(1)-120(2) (i.e., switching which endpoint 120(1), 120(2) they are directly facing), in accordance with the techniques depicted in FIG. 5, the near-end video conference system 104(1) may determine that both the content displayed at the first endpoint 120(1) and the content displayed at the second endpoint 120(2) should be awarded as being active content. In this scenario, the near-end video conference system 104(1) would send an indication to the far-end video conference system 104(2) that the content of both the first and second video conference endpoints 120(1), 120(2) are the current active contents and should be displayed. As illustrated in FIG. 9C, the content of the first video conference endpoints 120(1) and the content of the second video conference endpoint 120(2) are then simultaneously displayed side-by-side on the display 210 of the far-end video conference system 104(2).

Figure 10:
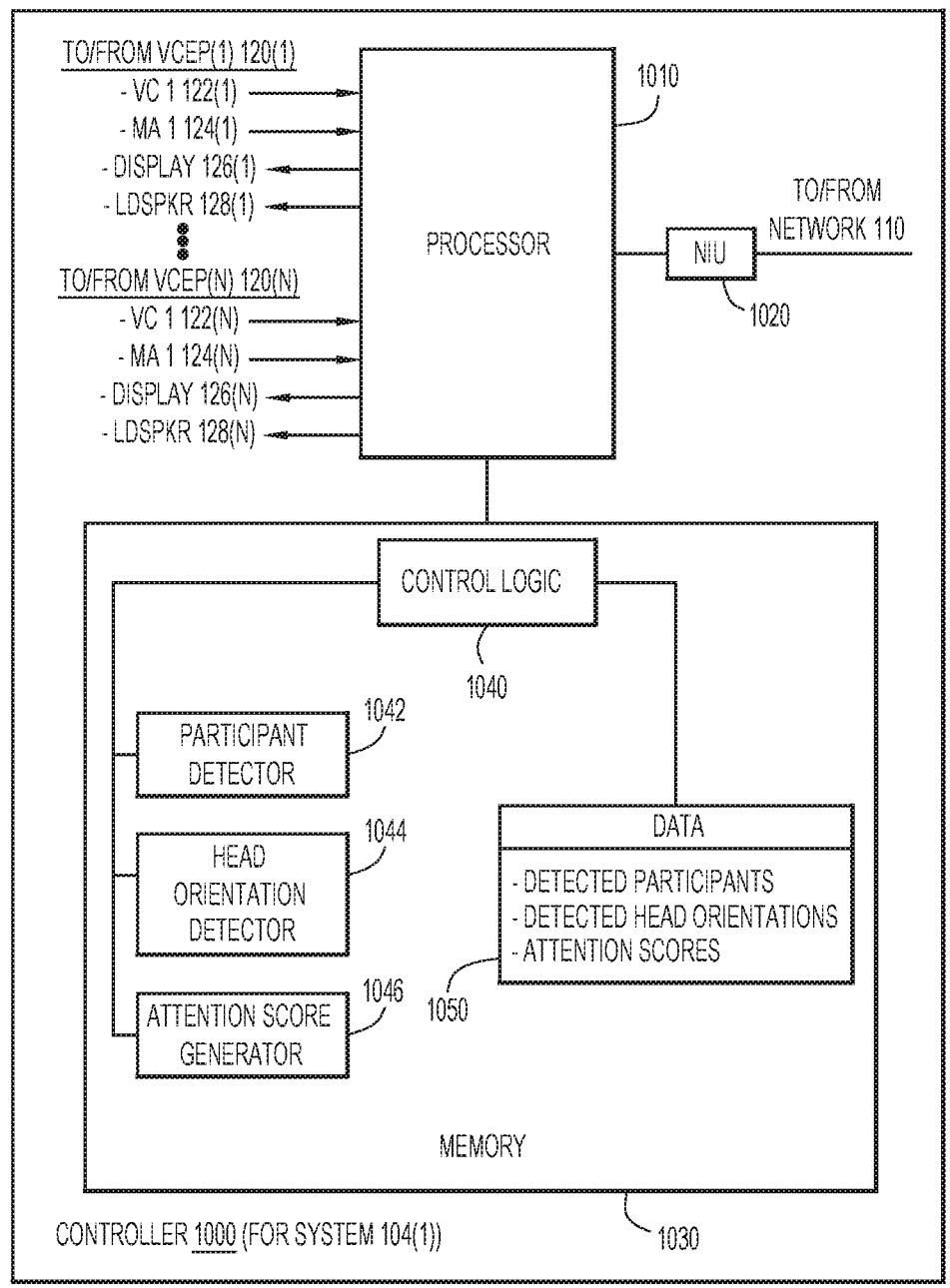
FIG. 10 is a block diagram of a controller of the near-end video conference system, wherein the controller is configured to perform the techniques for defining active content, according to an example embodiment.

Reference is now made to FIG. 10, which shows an example block diagram of a controller 1000 of the video conference system 104(1) configured to perform the techniques for determining the active content at the video conference system 104(1) according to embodiments described herein. In some embodiments, the controller 1000 may be located within one of the video conference endpoints 120(1)-120(N) that serves as a master video conference endpoint for multiple video conference endpoints at a location. In other embodiments, the functions of the controller 1000 may be performed by the conference server 102. There are numerous possible configurations for controller 1000 and FIG. 10 is meant to be an example. Controller 1000 includes a processor 1010, a network interface unit 1020, and memory 1030. The network interface (I/F) unit (NIU) 1020 is, for example, an Ethernet card or other interface device that allows the controller 1000 to communicate over communication network 110. Network I/F unit 1020 may include wired and/or wireless connection capability.

Processor 1010 may include a collection of microcontrollers and/or microprocessors, for example, each configured to execute respective software instructions stored in the memory 1030. The collection of microcontrollers may include, for example: a video controller to receive, send, and process video signals related to VC's 122(1)-122(N) and displays 126(1)-126(N); an audio processor to receive, send, and process audio signals related to MA's 124(1)-124(N) and LDSPKR's 128(1)-128(N); and a high-level controller to provide overall control. Processor 1010 may send pan, tilt, and zoom commands to VC's 122(1)-122(N), which is responsive to the commands as would be appreciated by one of ordinary skill in the relevant arts. Portions of memory 1030 (and the instruction therein) may be integrated with processor 1010. In the transmit direction, processor 1010 encodes audio/video captured by VC's 122(1)-122(N) and MA's 124(1)-124(N), encodes the captured audio/video into data packets, encodes the indication of the active content into packets, and causes the encoded data packets to be transmitted to communication network 110. In a receive direction, processor 1010 decodes audio/video from data packets received from communication network 110 and causes the audio/video to be presented to local participants via displays 126(1)-126(N) and LDSPKR's 128(1)-128(N).

The memory 1030 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1030 may comprise one or more computer readable storage media (e.g., a memory device) encoded with software comprising computer executable instructions and when the software is executed (by the processor 1010) it is operable to perform the operations described herein. For example, the memory 1030 stores or is encoded with instructions for Control Logic 1040 to perform overall control of video conference system 104(1) and operations described herein for determining the active content of the video conference system 104(1). Control Logic 1040 includes a Participant Detector 742 to detect faces, upper bodies, and/or motions of participants based on captured video, a Head Orientation Detector 744 to detect the head orientations of each participant with respect to each endpoint 120(1)-120(N) based on the captured video, and an Attention Score Generator 746 to generate attention scores for the content of the various endpoints 120(1)-120(N) and determine the active content of the video conference system 104(1).

In addition, memory 1030 stores data 1050 used and generated by logic/detectors 1040-1046, including, but not limited to: information associated with detected participants (e.g., positions, confidence levels, stored detected faces and the like); information associated with detected head orientations (e.g., orientation of each participant with respect to each endpoint 120(1)-120(N) of the video conference system 104(1)); and information associated with attention scores of content (e.g., current attention scores, previously issued attention scores, time stamp of previous issued attention scores, etc.).

Figure 11:
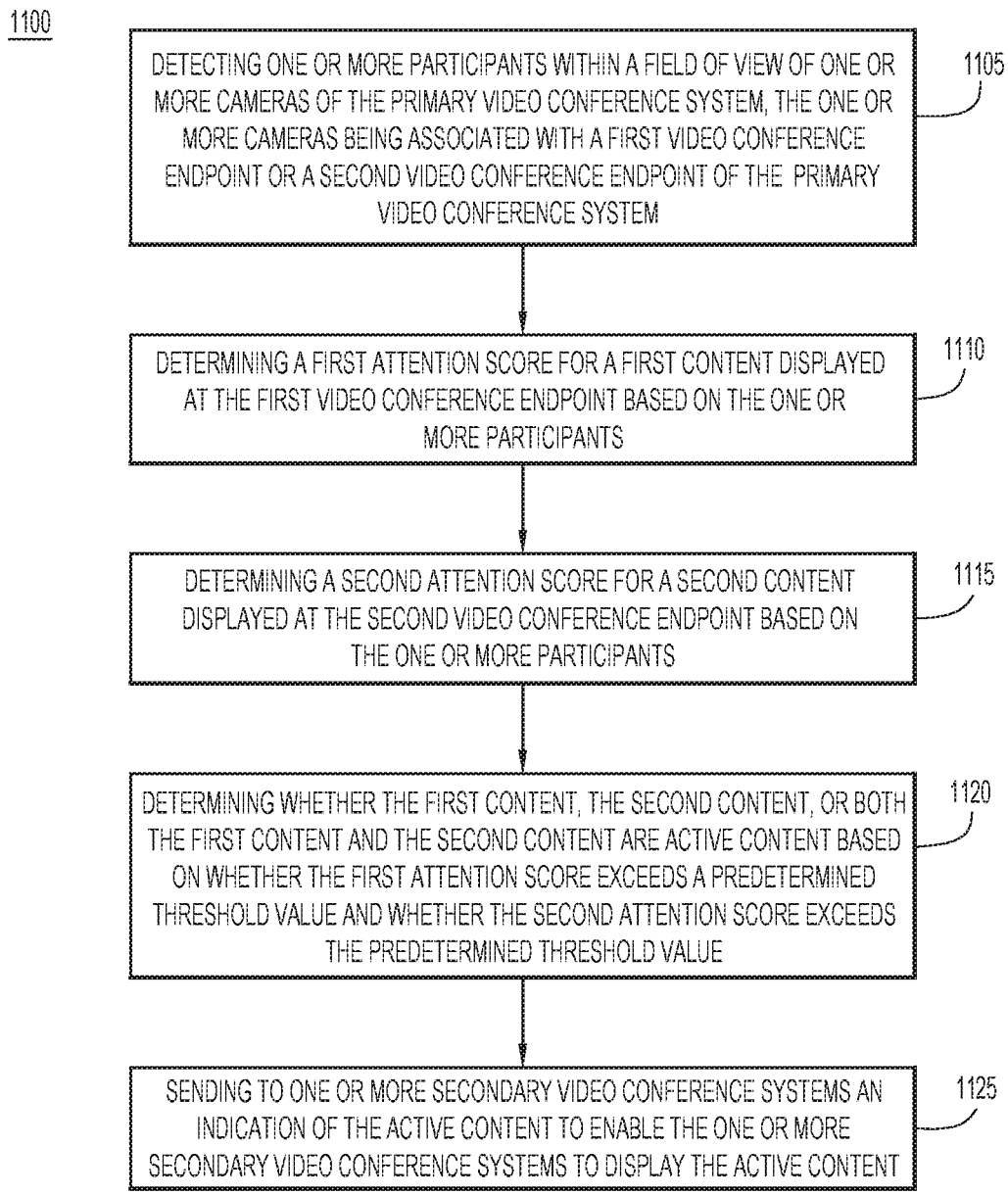
FIG. 11 is a flowchart of a method of defining active content of the near-end video conference system and sending information pertaining to the active content to one or more far-end video conference systems, according to an example embodiment.

With reference to FIG. 11, illustrated is a flowchart of a method 1100 performed by the near-end video conference system 104(1) for determining the active content at the near-end video conference system 104(1) and sending information to far-end video conference systems 104(2)-104(N) indicating the active content. Reference is also made to FIGS. 1, 2A-2C, 3A-3B, 4, 5, 6A-6C, 7, 8, 9A-9C, and 10 for purposes of the description of FIG. 11. At 1105, the primary or near-end video conference system 104(1) detects one or more participants within a field of view of a camera of the primary video conference system 104(1). As previously explained, the primary video conference system 104(1) may have a plurality of video conference endpoints 120(1)-120(N), and each of the video conference endpoints 120(1)-120(N) may or may not include a camera. As illustrated in FIGS. 2A, 6A-6C, 7, 8, and 9A-9C, the participants 106 may be disposed within a conference room 200 and facing various different video conference endpoints 120(1)-120(N). The primary video conference system 104(1) may detect the participants by using one or more of face detection, upper body detection, or motion detection techniques with the output of the one or more video cameras 122(1)-122(N) of the primary video conference system 104(1).

At 1110, the primary video conference system 104(1) may determine a first attention score for a first content displayed at the first video conference endpoint 120(1) based on each of the participants. The primary video conference system 104(1) may assign the first content a first attention score based on the head orientation of each of the participants with respect to the first video conference endpoint 120(1) (e.g., using gaze detection techniques) or by determining the location/proximity of each participant with respect to the first video conference endpoint 120(1) (e.g., using audio triangulation techniques or other location detection techniques, such as facial recognition techniques, upper body recognition techniques, motion detection techniques, etc.). At 1115, the primary video conference system 104(1) may determine a second attention score for a second content displayed at the second video conference endpoint 120(2) based on each of the participants. The primary video conference system 104(1) may assign the second content a second attention score based on the head orientation of each of the participants with respect to the second video conference endpoint 120(2) (e.g., using gaze detection techniques) or by determining the location/proximity of each participant with respect to the second video conference endpoint 120(2) (e.g., using audio triangulation techniques or other location detection techniques, such as facial recognition techniques, upper body recognition techniques, motion detection techniques, etc.). At 1120, the primary video conference system 104(1) may determine whether the first content and/or the second content are active content at the primary video conference system 104(1) based on whether the first attention score and/or the second attention score exceeds a predetermined threshold value. At 1125, the primary video conference system 104(1) then send to one or more far-end or secondary video conference systems 104(2)-104(N) an indication as to which content is the active content of the primary video conference system 104(1). This indication enables the secondary video conference systems 104(2)-104(N), which may each contain only one display, to display the active content.

In summary, during video conferences with asymmetrical configurations (i.e., one conference system having more endpoints and displays than another conference system), current video conference systems require their local participants to switch the content that is being displayed. This degrades the user experience at the video conference systems because, when the participants should be engaging and/or listening, they may be trying to display the content that is currently on topic at the other video conference systems. This may cause the participants to miss details of a discussion. According to one embodiment, presented herein is a method for a near-end video conference system to automatically determine which content of multiple pieces of content is the active content during a video conference, and then sends the other video conference systems an indication of the content that is the active content. This enables the far-end video conference systems to automatically emphasize and display the active content without requiring input from the participants local to the far-end video conference systems, and improving their user experience during the video conference.

In one form, a method is provided comprising: detecting, by a primary video conference system, one or more participants within a field of view of one or more cameras of the primary video conference system, the one or more cameras being associated with a first video conference endpoint or a second video conference endpoint of the primary video conference system; determining, by the primary video conference system, a first attention score for a first content displayed at the first video conference endpoint based on the one or more participants; determining, by the primary video conference system, a second attention score for a second content displayed at the second video conference endpoint based on the one or more participants; determining, by the primary video conference system, whether the first content, the second content, or both the first content and the second content are active content based on whether the first attention score exceeds a predetermined threshold value and whether the second attention score exceeds the predetermined threshold value; and sending, by the primary video conference system, to one or more secondary video conference systems an indication of the active content to enable the one or more secondary video conference systems to display the active content.

In another form, an apparatus is provided comprising: a network interface unit that enables communication over a network by a primary video conference system having a first video conference endpoint and a second video conference endpoint; and a processor coupled to the network interface unit, the processor configured to: detect one or more participants within a field of view of one or more cameras of the primary video conference system, the one or more cameras being associated with the first video conference endpoint or the second video conference endpoint; determine a first attention score for a first content displayed at the first video conference endpoint based on the one or more participants; determine a second attention score for a second content displayed at the second video conference endpoint based on the one or more participants; determine whether the first content, the second content, or both the first content and the second content are active content based on whether the first attention score exceeds a predetermined threshold value and whether the second attention score exceeds the predetermined threshold value; and send to one or more secondary video conference systems an indication of the active content to enable the one or more secondary video conference systems to display the active content.

In yet another form, a non-transitory processor readable medium is provided. The medium stores instructions that, when executed by a processor, cause the processor to: detect one or more participants within a field of view of one or more cameras of the primary video conference system, the one or more cameras being associated with a first video conference endpoint or a second video conference endpoint of the video conference system; determine a first attention score for a first content displayed at the first video conference endpoint based on the one or more participants; determine a second attention score for a second content displayed at the second video conference endpoint based on the one or more participants; determine whether the first content, the second content, or both the first content and the second content are active content based on whether the first attention score exceeds a predetermined threshold value and whether the second attention score exceeds the predetermined threshold value; and send to one or more secondary video conference systems an indication of the active content to enable the one or more secondary video conference systems to display the active content.

The above description is intended by way of example only. Various modifications and structural changes may be made therein without departing from the scope of the concepts described herein and within the scope and range of equivalents of the claims.

What is claimed is:
1. A method comprising:
   detecting, by a primary video conference system participating in a collaboration session with one or more secondary video conference systems, one or more participants within a field of view of one or more cameras of the primary video conference system, the primary video conference system including at least a first video conference endpoint and a second video conference endpoint, the one or more cameras being associated with the first video conference endpoint and/or the second video conference endpoint of the primary video conference system;

determining, by the primary video conference system, a first attention score for a first content displayed at the first video conference endpoint based on the one or more participants;

determining, by the primary video conference system, a second attention score for a second content displayed at the second video conference endpoint based on the one or more participants;

determining, by the primary video conference system, whether the first content and/or the second content are active content based on the first attention score and the second attention score; and sending, by the primary video conference system, to the one or more secondary video conference systems an indication of the active content.

2. The method of claim 1, wherein the one or more secondary video conference systems include a single display.

3. The method of claim 1, further comprising:
determining, by the primary video conference system, a first head orientation of each of the one or more participants with respect to the first video conference endpoint based on an output of the one or more cameras, the first attention score being based on the first head orientation of each of the one or more participants; and
determining, by the primary video conference system, a second head orientation of each of the one or more participants with respect to the second video conference endpoint based on the output of the one or more cameras, the second attention score being based on the second head orientation of each of the one or more participants.

4. The method of claim 3, wherein the one or more cameras include a first camera associated with the first video conference endpoint, and a second camera associated with the second video conference endpoint, the first head orientation of each of the one or more participants being determined from a first output of the first camera of the first video conference endpoint, and the second head orientation of each of the one or more participants being determined from a second output of the second camera of the second video conference endpoint.

5. The method of claim 4, wherein determining the first attention score further comprises:
assigning a first orientation value to the first head orientation of each of the one or more participants; and
summing the first orientation values.

6. The method of claim 5, wherein determining the second attention score further comprises:
assigning a second orientation value to the second head orientation of each of the one or more participants; and
summing the second orientation values.

7. The method of claim 1, wherein determining whether the first content and/or the second content are active content further comprises:
determining whether the first attention score and/or the second attention score exceed a predetermined threshold value.

8. The method of claim 7, further comprising:
determining if there has been a repeated back and forth shift between the first content exceeding the predetermined threshold value and the second content exceeding the predetermined threshold value within a predetermined period of time.

9. An apparatus comprising:
a network interface unit that enables communication over a network on behalf of a primary video conference system to support the primary video conference system participating in a collaboration session with one or more secondary video conference systems, the primary video conference system including a first video conference endpoint and a second video conference endpoint; and
a processor coupled to the network interface unit, the processor configured to:
detect one or more participants within a field of view of one or more cameras of the primary video conference system, the one or more cameras being associated with the first video conference endpoint and/or the second video conference endpoint;
determine a first attention score for a first content displayed at the first video conference endpoint based on the one or more participants;
determine a second attention score for a second content displayed at the second video conference endpoint based on the one or more participants;
determine whether the first content and/or the second content are active content based on the first attention score and the second attention score; and
send to the one or more secondary video conference systems an indication of the active content.

10. The apparatus of claim 9, wherein the processor is further configured to:
determine a first head orientation of each of the one or more participants with respect to the first video conference endpoint based on an output of the one or more cameras, the first attention score being based on the first head orientation of each of the one or more participants; and
determine a second head orientation of each of the one or more participants with respect to the second video conference endpoint based on the output of the one or more cameras, the second attention score being based on the second head orientation of each of the one or more participants.

11. The apparatus of claim 10, wherein the one or more cameras include a first camera associated with the first video conference endpoint, and a second camera associated with the second video conference endpoint, the first head orientation of each of the one or more participants being determined from a first output of the first camera of the first video conference endpoint, and the second head orientation of each of the one or more participants being determined from a second output of the second camera of the second video conference endpoint.

12. The apparatus of claim 11, wherein, when determining the first attention score, the processor is further configured to:
assign a first orientation value to the first head orientation of each of the one or more participants; and
sum the first orientation values.

13. The apparatus of claim 12, wherein, when determining the second attention score, the processor is further configured to:
assign a second orientation value to the second head orientation of each of the one or more participants; and
sum the second orientation values.

14. The apparatus of claim 9, wherein, when determining whether the first content and/or the second content are active content, the processor is further configured to:
  determine whether the first attention score and/or the second attention score exceed a predetermined threshold value.

15. The apparatus of claim 14, wherein the processor is further configured to:
  determine if there has been a repeated back and forth shift between the first content exceeding the predetermined threshold value and the second content exceeding the predetermined threshold value within a predetermined period of time.

16. A non-transitory processor readable medium storing instructions that, when executed by a processor, cause the processor to:
  detect one or more participants within a field of view of one or more cameras of a primary video conference system participating in a collaboration session with one or more secondary video conference systems, the primary video conference system including at least a first video conference endpoint and a second video conference endpoint, the one or more cameras being associated with the first video conference endpoint and/or the second video conference endpoint of the primary video conference system;
  determine a first attention score for a first content displayed at the first video conference endpoint based on the one or more participants;
  determine a second attention score for a second content displayed at the second video conference endpoint based on the one or more participants;
  determine whether the first content and/or the second content are active content based on the first attention score and the second attention score; and
  send to the one or more secondary video conference systems an indication of the active content.

17. The non-transitory processor readable medium of claim 16, further comprising instructions that, when executed by the processor, cause the processor to:
  determine a first head orientation of each of the one or more participants with respect to the first video conference endpoint based on an output of the one or more cameras, the first attention score being based on the first head orientation of each of the one or more participants; and
  determine a second head orientation of each of the one or more participants with respect to the second video conference endpoint based on the output of the one or more cameras, the second attention score being based on the second head orientation of each of the one or more participants.

18. The non-transitory processor readable medium of claim 17, wherein the one or more cameras include a first camera associated with the first video conference endpoint, and a second camera associated with the second video conference endpoint, the first head orientation of each of the one or more participants being determined from a first output of the first camera of the first video conference endpoint, and the second head orientation of each of the one or more participants being determined from a second output of the second camera of the second video conference endpoint.

19. The non-transitory processor readable medium of claim 18, further comprising, when the processor determines the first attention score, instructions that, when executed by the processor, cause the processor to:
  assign a first orientation value to the first head orientation of each of the one or more participants; and
  sum the first orientation values.

20. The non-transitory processor readable medium of claim 19, further comprising, when the processor determines the second attention score, instructions that, when executed by the processor, cause the processor to:
  assigning a second orientation value to the second head orientation of each of the one or more participants; and
  sum the second orientation values.

* * * * *